(12) United States Patent
Otani et al.

(10) Patent No.: US 11,306,733 B2
(45) Date of Patent: Apr. 19, 2022

(54) WASHER PUMP HAVING A PAIR OF FLOW PATHS WITH THE PUMP SIDE OF ONE OF THE FLOW PATHS BEING SMALLER THAN THE VALVE CHAMBER SIDE OF THE ONE FLOW PATH

(71) Applicant: Mitsuba Corporation, Gunma (JP)

(72) Inventors: Atsushi Otani, Gunma (JP); Satoshi Ishikura, Gunma (JP)

(73) Assignee: Mitsuba Corporation, Kiryu (JP)

(\*) Notice: Subject to any disclaimer, the term of this patent is extended or adjusted under 35 U.S.C. 154(b) by 180 days.

(21) Appl. No.: 16/303,761

(22) PCT Filed: May 8, 2017

(86) PCT No.: PCT/JP2017/017386
§ 371 (c)(1),
(2) Date: Nov. 21, 2018

(87) PCT Pub. No.: WO2017/208732
PCT Pub. Date: Dec. 7, 2017

(65) Prior Publication Data
US 2019/0359177 A1    Nov. 28, 2019

(30) Foreign Application Priority Data

May 31, 2016  (JP) .............................. JP2016-108822
Jun. 6, 2016   (JP) .............................. JP2016-112941
(Continued)

(51) Int. Cl.
*F04D 13/16*        (2006.01)
*F04D 29/48*        (2006.01)
(Continued)

(52) U.S. Cl.
CPC .......... *F04D 29/4293* (2013.01); *B60S 1/481* (2013.01); *F04D 13/16* (2013.01);
(Continued)

(58) Field of Classification Search
CPC .. B60S 1/48; B60S 1/483; F04D 29/48; F04D 29/60; F04D 29/486; F04D 29/42;
(Continued)

(56) References Cited

U.S. PATENT DOCUMENTS 3,136,254 A * 6/1964 Douglas ................. D06F 39/085
                                                          415/206
3,751,179 A * 8/1973 Wassmann .......... F04D 29/2205
                                                          415/228
(Continued)

FOREIGN PATENT DOCUMENTS

DE     10 2006 039 714 B3    1/2008
EP         3 021 019 A1      5/2016
(Continued)

OTHER PUBLICATIONS

International Search Report for PCT Serial No. PCT/JP2017/017386 dated Jun. 27, 2017.
(Continued)

*Primary Examiner* — Nathan C Zollinger
*Assistant Examiner* — Timothy P Solak
(74) *Attorney, Agent, or Firm* — McCormick, Paulding & Huber PLLC

(57) ABSTRACT

A pump chamber (32*a*), valve chambers (33*a* and 33*b*), discharge holes (33*e* and 33*f*), and flow paths (34 and 35) are integrally provided to each other in a housing (30), so that the pressure loss of the cleaning liquid "W" can be reduced. In addition, since valve chambers of the flow paths extend to the discharge holes, the cleaning liquid flowing out of the flow paths can be discharged at a portion closer to the central (Continued)

of the valve chambers. As a result, the outlet portions of the flow paths and the inlet portions of the discharge holes is brought closer to each other, and the turbulent of the cleaning liquid in the valve chambers can be suppressed, thereby reducing the pressure loss.

2 Claims, 18 Drawing Sheets

(30) Foreign Application Priority Data

Jun. 13, 2016 (JP) .............................. JP2016-117091
Jun. 13, 2016 (JP) .............................. JP2016-117092

(51) Int. Cl.
*F04D 29/22* (2006.01)
*F04D 29/42* (2006.01)
*B60S 1/48* (2006.01)
*F04D 13/06* (2006.01)

(52) U.S. Cl.
CPC .......... *F04D 29/2283* (2013.01); *F04D 29/42* (2013.01); *F04D 29/48* (2013.01); *F04D 29/486* (2013.01); *F04D 13/06* (2013.01)

(58) Field of Classification Search
CPC .. F04D 29/007; F04D 29/406; F04D 29/2283; F04D 29/506; F04D 1/04; F04D 13/0686; F04D 15/005; F04D 15/0027
See application file for complete search history.

(56) References Cited

U.S. PATENT DOCUMENTS

| | | | |
|---|---|---|---|
| 5,934,872 A | 8/1999 | Yamauchi et al. | |
| 2012/0114473 A1* | 5/2012 | Badafem | F04D 29/486 415/203 |
| 2014/0056734 A1* | 2/2014 | Yamauchi | F04D 29/22 417/321 |
| 2014/0166109 A1* | 6/2014 | Takai | F16K 17/0473 137/1 |
| 2014/0286747 A1* | 9/2014 | Fang | F04D 29/486 415/1 |
| 2014/0348675 A1* | 11/2014 | Guo | F04D 29/2255 417/423.14 |
| 2014/0356200 A1* | 12/2014 | Chan | H02K 5/145 417/423.7 |
| 2016/0214577 A1 | 7/2016 | Otani | |

FOREIGN PATENT DOCUMENTS

| | | |
|---|---|---|
| JP | H06-077466 U | 10/1994 |
| JP | H09188227 A | 7/1997 |
| JP | H11117900 A | 4/1999 |
| JP | 2001-258197 A | 9/2001 |
| JP | 2007211686 A | 8/2007 |
| JP | 2008002407 A | 1/2008 |
| JP | 2012-232696 A | 11/2012 |
| JP | 2015014347 A | 1/2015 |
| JP | 2016034229 A | 3/2016 |

OTHER PUBLICATIONS

Supplementary European Search Report for EP Patent Application No. 17806291.5 dated Dec. 20, 2019.

* cited by examiner

FIG. 13
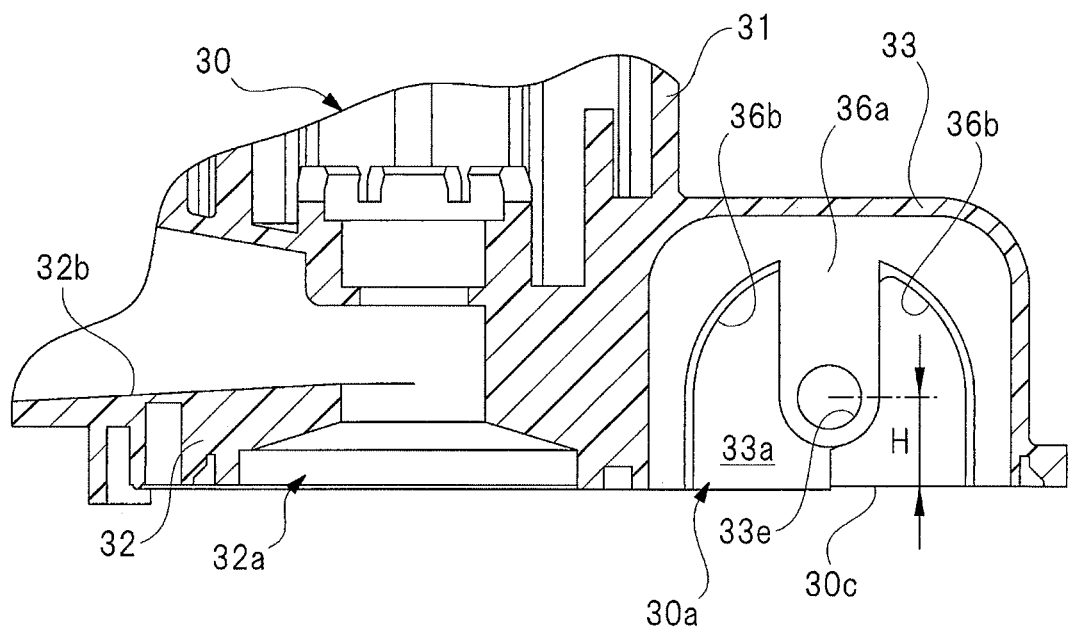
(a)
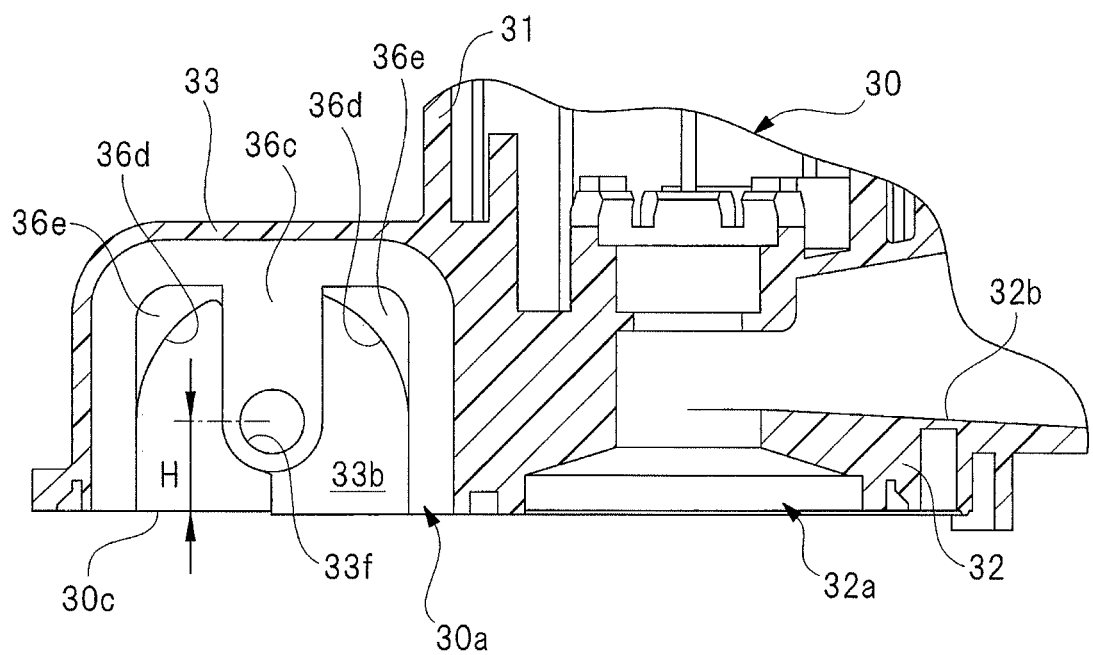
(b)

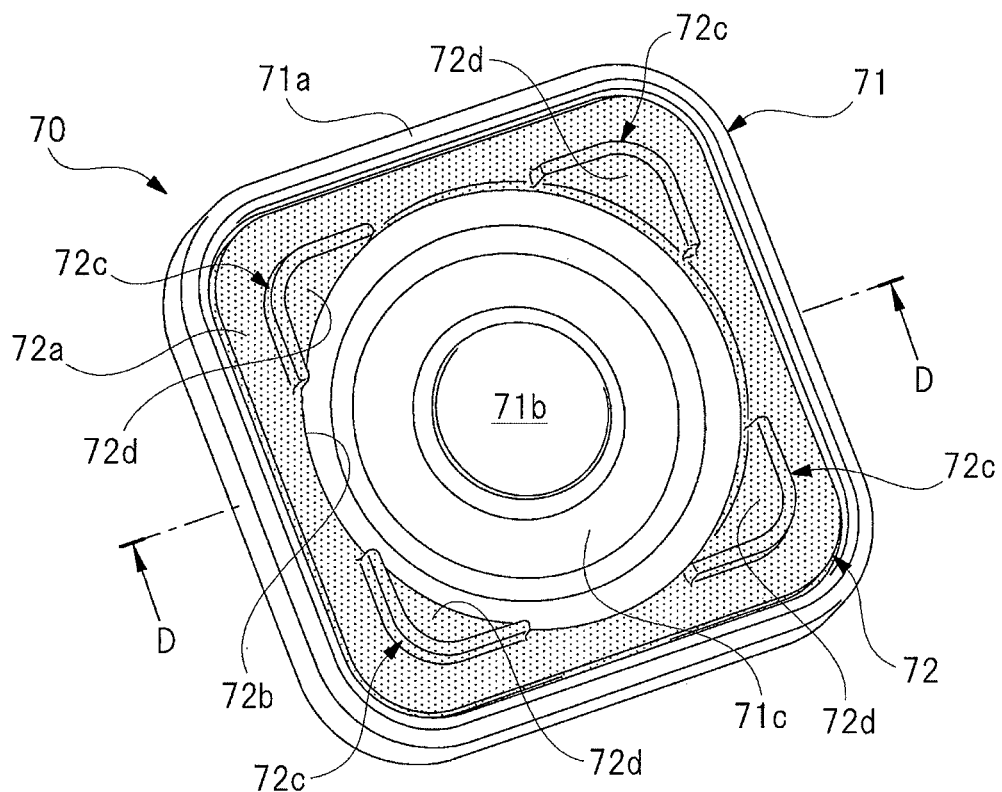
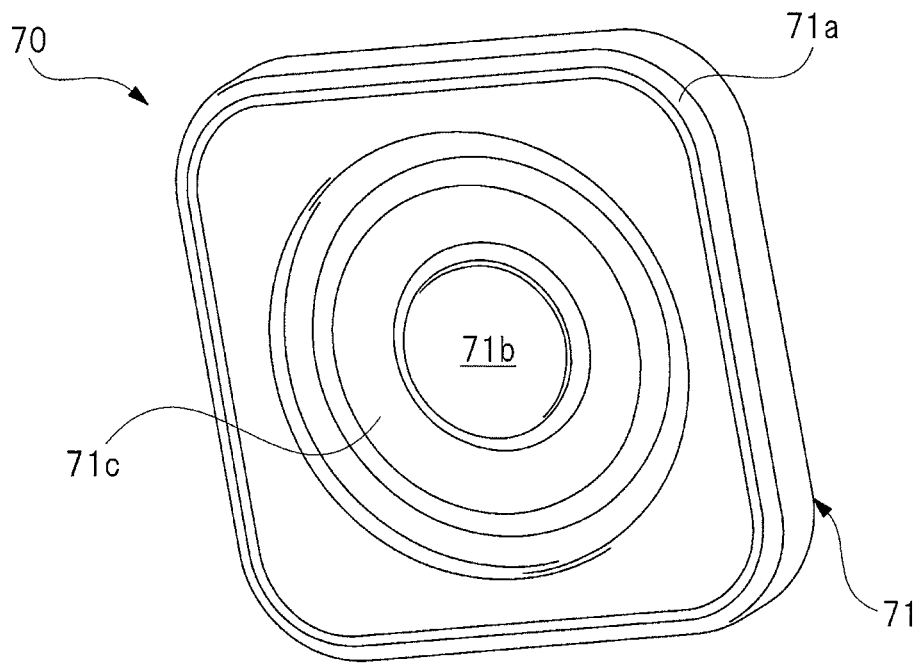
FIG. 14

WASHER PUMP HAVING A PAIR OF FLOW PATHS WITH THE PUMP SIDE OF ONE OF THE FLOW PATHS BEING SMALLER THAN THE VALVE CHAMBER SIDE OF THE ONE FLOW PATH

CROSS-REFERENCE TO RELATED APPLICATIONS

This application is a National Stage application of International Patent Application No. PCT/JP2017/017386, filed on May 8, 2017, which claims priority to Japanese Patent Application Numbers 2016-108822, filed on May 31, 2016; 2016-112941, filed on Jun. 6, 2016; 2016-117091, filed on Jun. 13, 2016; and 2016-117092, filed on Jun. 13, 2016, each of which is hereby incorporated by reference in its entirety.

TECHNICAL FIELD

The present invention relates to a washer pump configured to suck a liquid stored in a tank, and to jet the liquid onto an object to be cleaned.

BACKGROUND ART

Windshields are respectively provided on the front-side and the rear-side of a vehicle such as automotive vehicle, and washer apparatuses for cleaning the windshields are provided to predetermined positions in an engine-compartment. The washer apparatus includes a washer pump and a tank for storing a liquid. The washer pump is driven by the operation of the operation switch, and injects a liquid in the tank to each of the windshields in accordance with the rotation direction of the motor. Then, the liquid jetted to the windshield is wiped by the wiper blade by driving the wiper apparatus, whereby the windshield (cleaning surface) is cleaned cleanly.

A washer pump for sucking a liquid stored in a tank, and jetting the liquid onto a cleaning surface includes, for example, a technical described in Japanese Patent Application Laid-Open Publication No. JP2015-014347.

The washer pump described Japanese Patent Application Laid-Open Publication No.: JP2015-014347 includes: a receiving chamber (pump chamber) for receiving an impeller; first and second valve chambers (valve chambers) in which cleaning liquid (liquid) flows in accordance with the rotation direction of the impeller; first and second passages (flow paths) for connecting the receiving chamber to the first and second valve chambers; a valve main body (switching valve) for separating the first and second valve chambers from each other; and first and second liquid pipes (discharge holes) provided on both sides of the moving direction of the valve main body.

SUMMARY

However, according to the washer pump described in Japanese Patent Application Laid-Open Publication No.: JP2015-014347, the liquid flows from the pump chamber toward the flow path by rotation of the impeller, and the liquid flowing into the flow path flows vigorously through the flow path. Then, the liquid flowing through the flow path is forcefully discharged from the end portion of the valve chamber to the inside of the valve chamber. That is, the liquid discharged from the flow path is rapidly diffused inside the valve chamber. The liquid discharged into the valve chamber vigorously moves in all directions inside the valve chamber and becomes turbulent flow. Specifically, liquids collide with each other. As a result, a pressure loss of the liquid occurs inside the valve chamber, and a loss occurs in the flow of the liquid. Therefore, problems such as lowering of the injection ability of the washer pump may occur.

It is an object of the present invention to provide a washer pump capable of suppressing a decrease in the injection ability and further reducing the size and weight of the washer pump.

In one aspect of the present invention, there is provided a washer pump configured to suck liquid stored in a tank and configured to jet the liquid to a surface to be cleaned, comprising: a motor that rotates in forward and reverse directions; an impeller rotated by the motor, a pump chamber in which the impeller is housed; a pair of valve chambers in which the liquid flows in response to the rotation direction of the impeller; a changeover valve for partitioning the pair of valve chambers; a pair of discharge holes provided on both sides of the switching valve in the moving direction; and a pair of flow paths provided between the pump chamber and the pair of valve chambers, wherein the pump chamber, the valve chamber, the discharge hole, and the flow paths are integrally provided to each other in the housing, and the flow paths extend to the discharge hole on the same side as the valve chamber.

In another aspect of the present invention, the flow passage area on the same side as the pump chamber of at least one of the flow paths is smaller than the flow passage area on the same side as the valve chamber.

In another aspect of the present invention, one of the flow paths has an inclined wall that gradually increases a flow passage area from the same side as the pump chamber toward the same side as the valve chamber.

In another aspect of the present invention, one of the flow path has an opposing wall facing the inclined wall, the opposing wall is disposed parallel to the side wall of the housing near the side wall, the inclined wall is provided on the inside of the side wall of the housing.

In another aspect of the present invention, the flow passage area of one of the flow path on the same side as the pump chamber is smaller than the flow passage area of the other of the flow paths on the same side as the pump chamber.

In another aspect of the present invention, one of the flow paths is provided corresponding to the injection of the liquid onto the surface on the front-side of the vehicle.

According to the present invention, since the pump chamber, the valve chamber, the discharge hole, and the flow path are integrally provided in the housing, in the case where these are formed of separate members, a step or the like that inhibits the flow of the liquid does not need to be formed in the path through which the liquid flows, so that the pressure loss of the liquid can be reduced.

In addition, since the valve chamber side of the flow path extends to the position of the discharge hole, the liquid flowing out of the flow path can be discharged at a portion closer to the central of the valve chamber than before. As a result, the outlet portion of the flow path and the inlet portion of the discharge hole can be brought close to each other, and turbulent of the liquid inside the valve chamber can be suppressed, so that pressure loss can be reduced.

Therefore, the lowering of the injection capability is suppressed, and in the washer pump having the same injection capability as in the past, it is possible to adopt a small motor having a low output, and it is possible to realize further size and weight reduction of the washer pump.

BRIEF DESCRIPTION OF THE DRAWINGS

FIGS. 13(a) and 13(b) are cross-sectional views each showing the position of the discharge hole with respect to the opening of the valve chamber;

FIGS. 14(a) and 14(b) are perspective views each showing the valve unit;

DETAILED DESCRIPTION

Hereinafter, an embodiment of the present invention will be described in detail with reference to the drawings.

Figure 1:
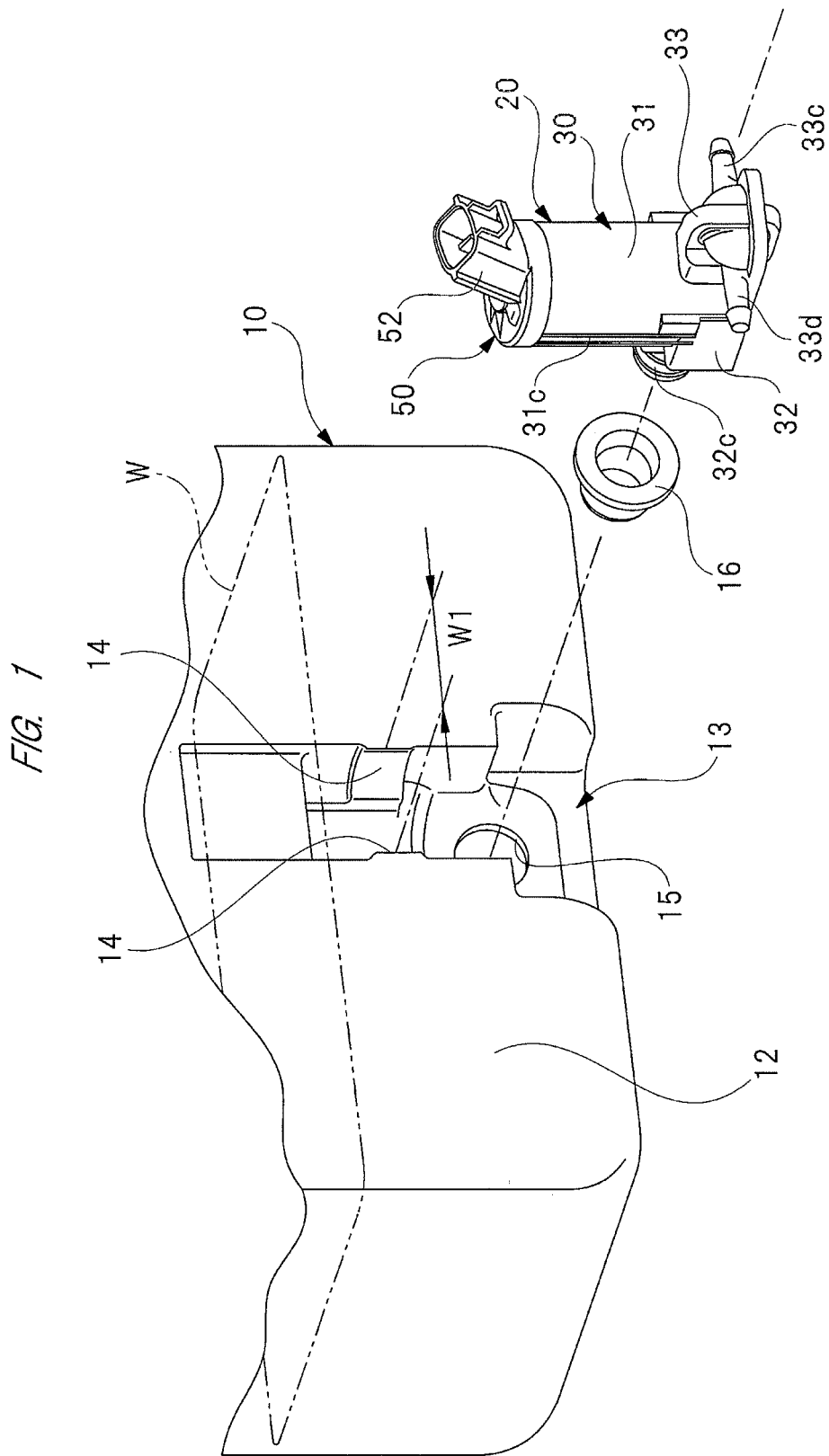
FIG. 1 is an exploded perspective view showing a washer pump according to the present invention, which is installed on a washer tank.

FIG. 1 is an exploded perspective view showing a washer pump of the present invention, which is installed on a washer tank.

As shown in FIG. 1, the washer tank (tank) 10 is formed into a hollow substantially rectangular parallelepiped shape from white and translucent plastic material or the like, and cleaning liquid (liquid) "W" such as washer liquid is stored in the washer tank. The washer tank 10 includes a tank wall 12 forming the washer tank 10, and a pump mounting portion 13 is integrally provided to the bottom of the tank wall 12. The pump mounting portion 13 is provided to a recessed portion of the washer tank 10, and the pump mounting portion 13 is provided with a pair of tank side retaining portions 14 for retaining the housing 30 of the washer pump 20. Each of the tank-side retaining portions 14 is provided by radially inwardly projecting part of the pump mounting portion 13, and the distance between the tank-side retaining portions 14 is set to W1.

The bottom of the pump mounting portion 13 is provided with an insertion hole 15 into which the suction pipe 32c of the washer pump 20 is inserted. A grommet 16 formed into an annular shape and formed of elastic material such as rubber is mounted in the insertion hole 15. The grommet 16 is elastically deformed between the washer tank 10 and the intake pipe 32c, and configured to seal a gap between the insertion hole 15 and the suction pipe 32c. As a result, the cleaning liquid "W" is prevented from being leaked from a gap between the washer tank 10 and the washer pump 20, and the washer pump 20 is prevented from being accidentally lumberingly moved with respect to the washer tank 10.

Note that, since the pump mounting portion 13 is composed of a recessed portion of the washer tank 10, most of the washer pump 20 is received in the pump mounting portion 13 with the suction pipe 32c inserted into the insertion hole 15 and the housing 30 held by each tank side retaining portion 14, that is, with the washer pump 20 assembled to the washer tank 10. Therefore, the washer pump 20 does not protrude greatly from the washer tank 10. Therefore, the washer tank 10 and the washer pump 20 (washer apparatus) can be easily installed in an engine-compartment (not shown) of a vehicle such as automotive vehicle. As shown in FIG. 1, the washer apparatus is installed in the engine-compartment with the pump mounting portion 13 located on lower side of the washer tank 10.

Figure 2:
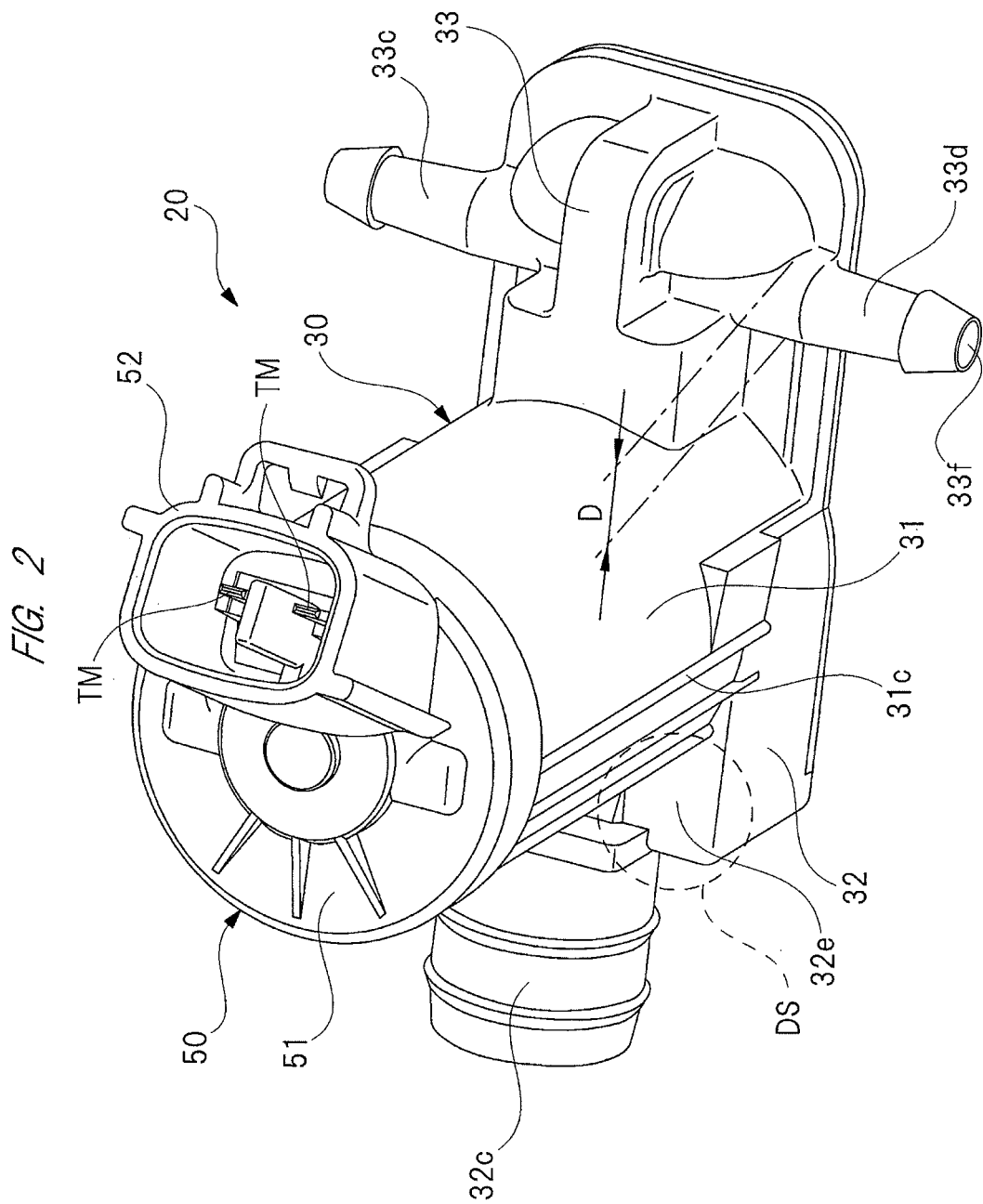
FIG. 2 is a perspective view showing the washer pump of FIG. 1 from the same side as the motor cover.
Figure 3:
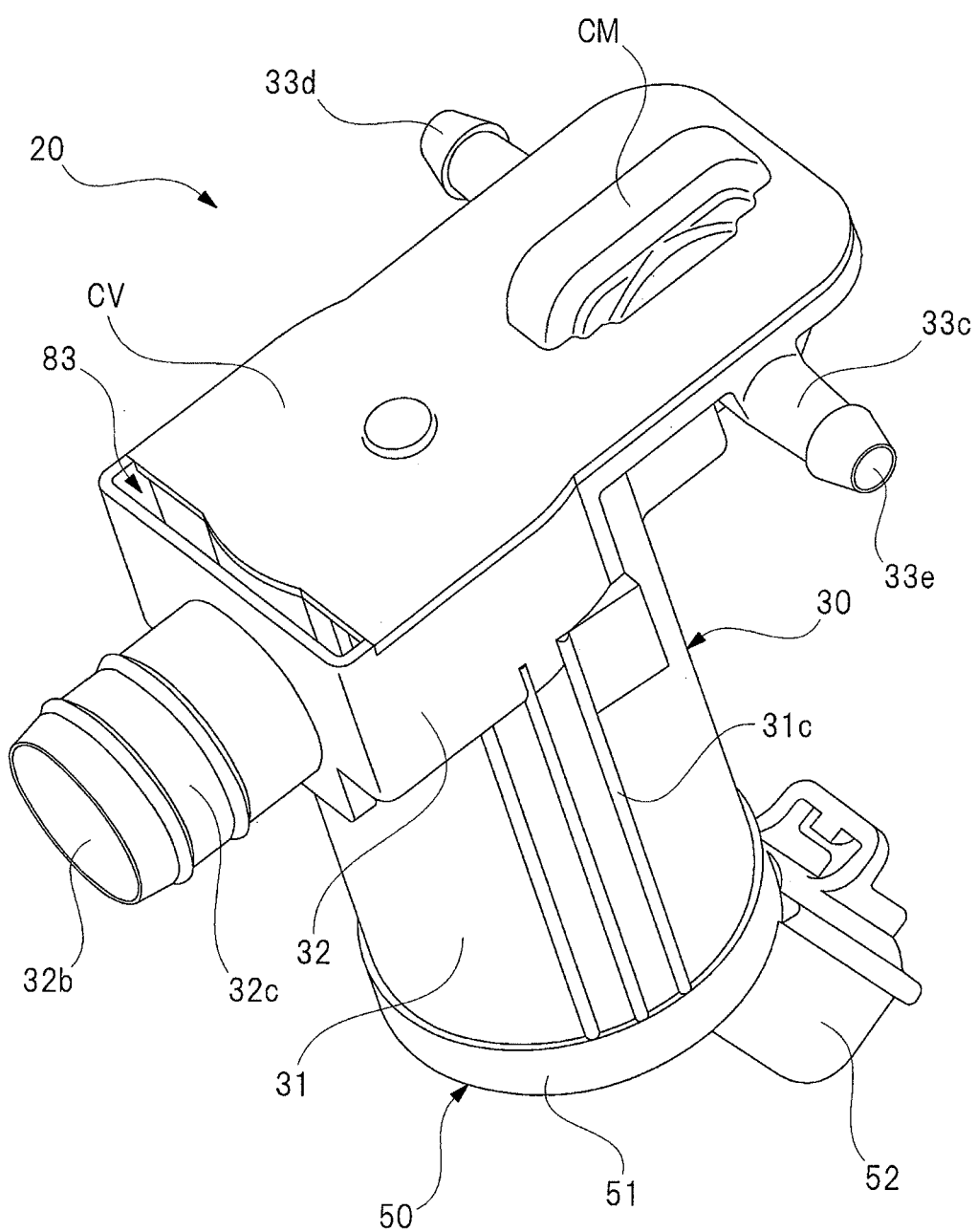
FIG. 3 is a perspective view showing the washer pump of FIG. 1 from the same side as the cover member.
Figure 4:
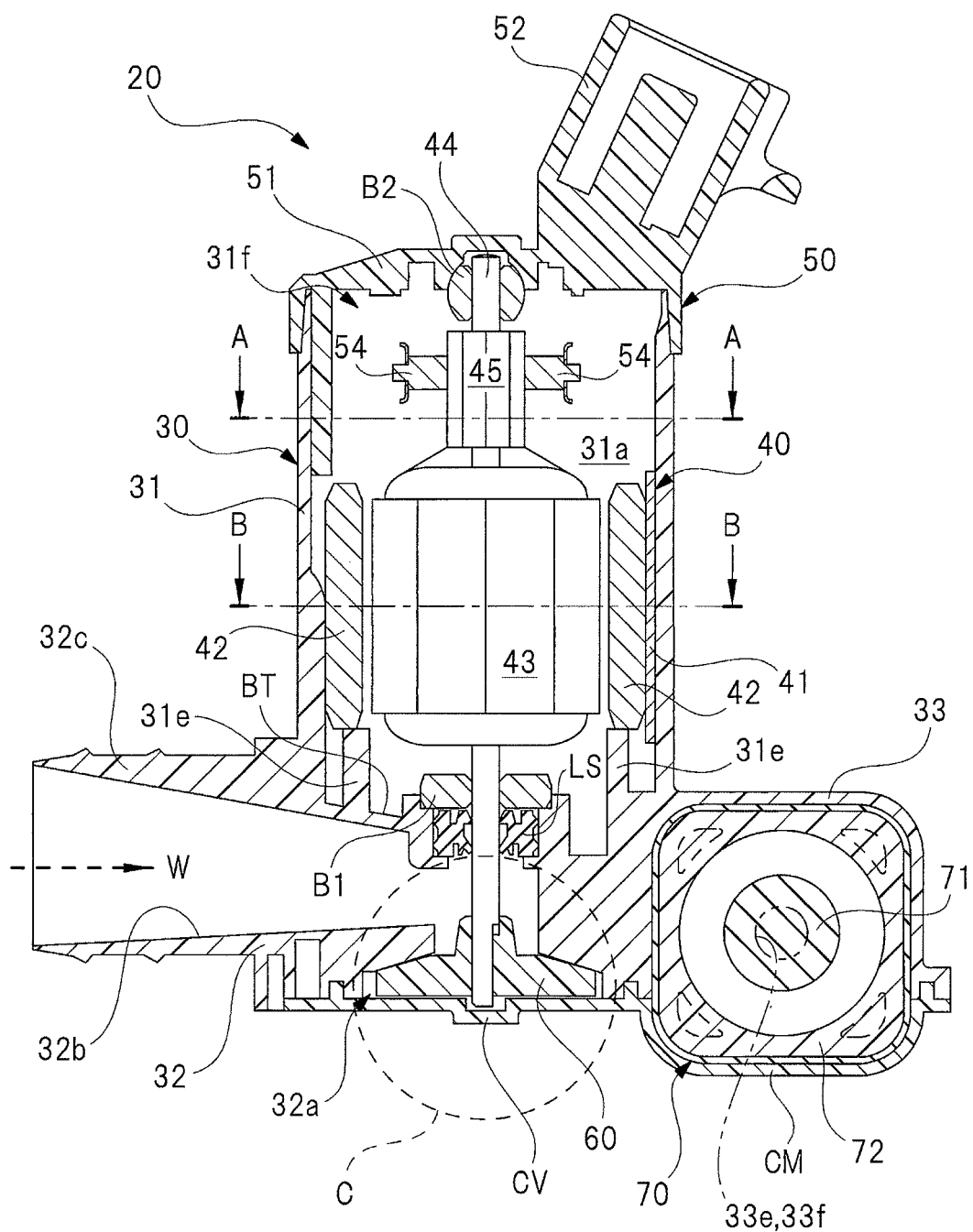
FIG. 4 is a cross-sectional view of the washer pump taken along an axis of the armature shaft.

FIG. 2 is a perspective view showing the washer pump of FIG. 1 from the same side as the motor cover, FIG. 3 is a perspective view showing the washer pump of FIG. 1 from the same side as the cover member, and FIG. 4 is a cross-sectional view of the washer pump taken along the axial direction of the armature shaft.

As shown in FIGS. 2 to 4, the washer pump 20 includes a housing 30 which is formed so as to have a substantially T-shaped cross section by injection molding or the like of resin material such as plastic. Among components constituting the washer pump 20, the housing 30 is a large component, and forms an outline of the washer pump 20. In other words, by reducing the size of the housing 30, it is possible to realize the washer pump 20 improved in size. The housing 30 includes: a motor accommodating portion 31, a pump accommodating portion 32, and a valve body accommodating portion 33.

Figure 5:
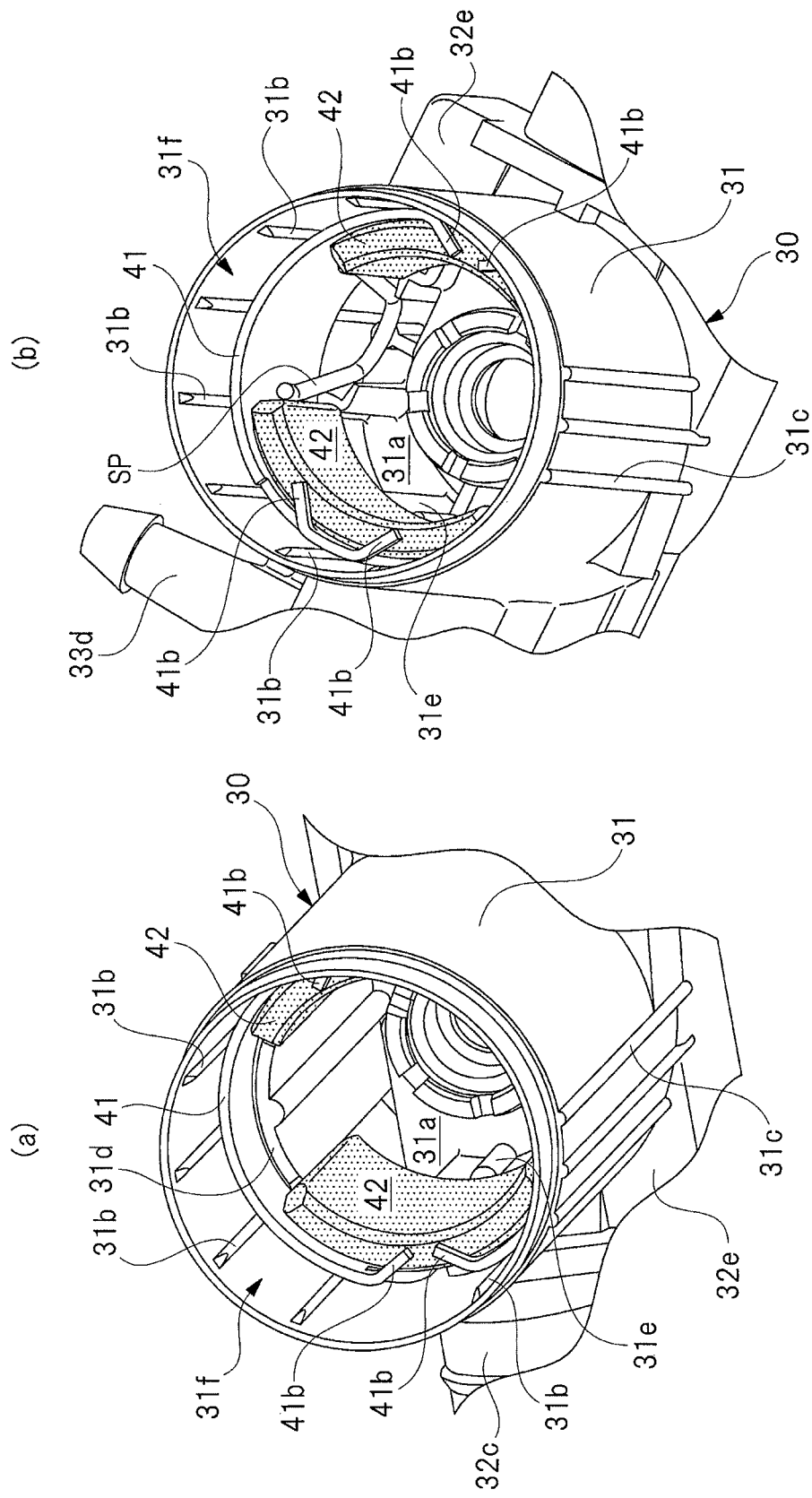
FIGS. 5(a) and 5(b) are perspective views each showing a fixed structure of the magnet to the motor accommodating portion.
Figure 6:
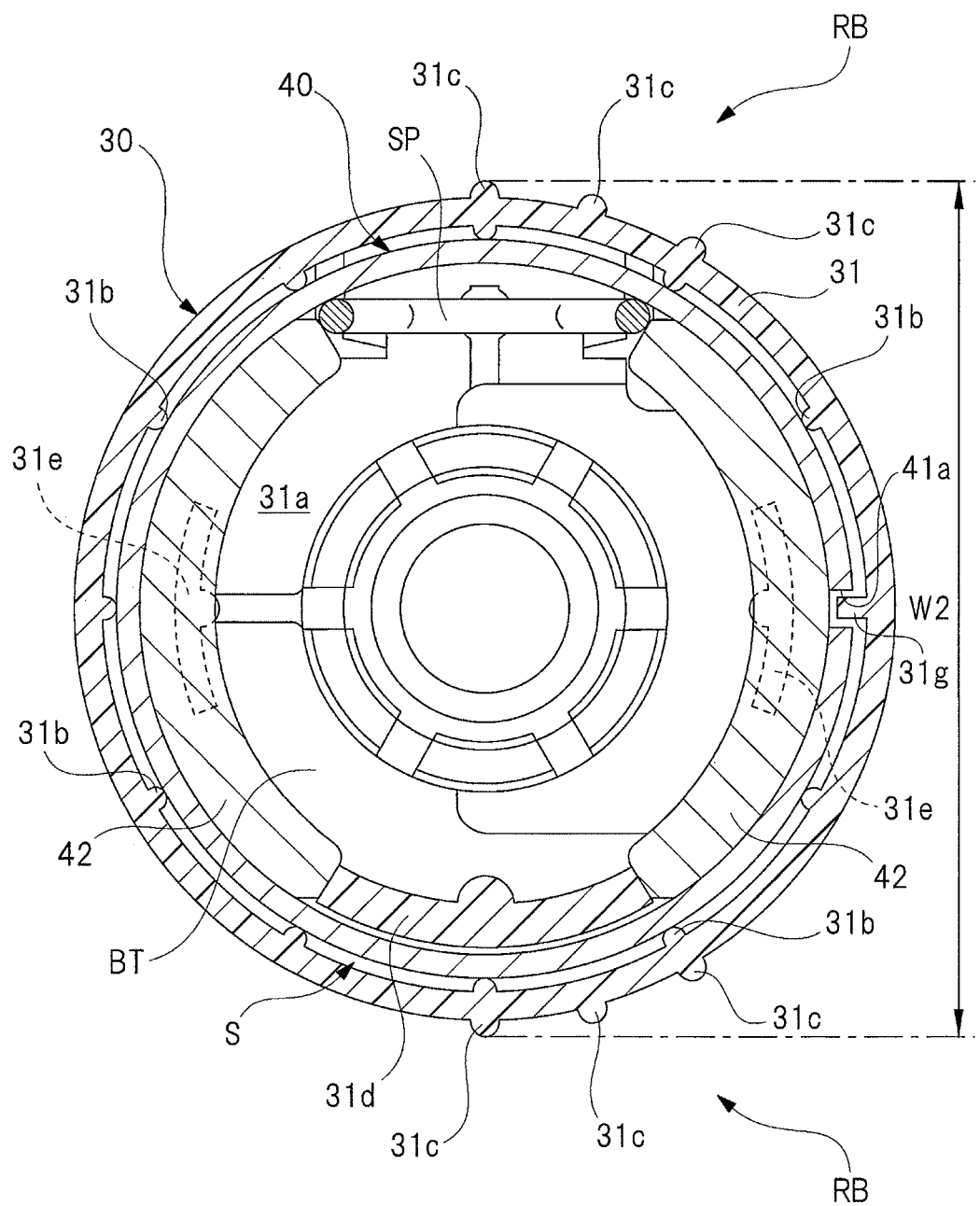
FIG. 6 is a cross-sectional view of the motor accommodating portion taken in a direction intersecting the axis of the armature shaft.

FIGS. 5(a) and 5(b) are perspective views each showing a fixing structure of the magnet to the motor accommodating portion, and FIG. 6 is a cross-sectional view of the motor accommodating portion along a direction intersecting with the axial direction of the armature shaft, respectively.

As shown in FIGS. 2 to 6, the motor accommodating portion 31 is formed into a generally cylindrical shape, and formed with a motor chamber 31a in which the motor 40 is accommodated, and which is positioned on the inside of the motor accommodating portion 31 in the radial direction thereof. A plurality of support ribs 31b is provided on the inside of the yoke 41 in the radial direction thereof, which forms part of the motor 40, and configured to support the outside of the yoke 41. The support ribs 31b also serve to reinforce the motor accommodating portion 31. Each of the support ribs 31b extends in the axial direction of the motor accommodating portion 31, and they are disposed at predetermined intervals in the circumferential direction of the motor accommodating portion 31. As a result, it is possible to suppress the motor 40 from being accidentally moved and rattled in the motor accommodating portion 31 without making it difficult to mount the motor 40 to the motor accommodating portion 31.

Furthermore, as shown in FIG. 6, a pair of rib groups RB composed of three reinforcing ribs 31c is provided on the outside of the motor accommodating portion 31 in the radial direction thereof, that is, on the outer circumference portion. These rib groups RB are provided for the downsizing (and thinning) of the motor accommodating portion 31, and serve to reinforce the motor accommodating portion 31. A total of six reinforcing ribs 31c extend in the axial direction of the motor accommodating portion 31, similarly to the supporting ribs 31b provided on the inside of the motor accommodating portion 31 in the radial direction thereof. The pair of rib groups RB is arranged at intervals of approximately 180 degrees so as to face each other about the axial center of the motor accommodating portion 31. In addition, among the reinforcing ribs 31c forming each rib group RB, the separation dimension of the apexes of the reinforcing ribs 31c that are the farthest apart from each other is set to W2.

Note that the motor accommodating portion 31 of the housing 30 is a portion to be held by each tank-side retaining portion 14 of the washer tank 10. Specifically, a pair of reinforcing ribs 31c each having a separation dimension W2 is sandwiched between the tank-side retaining portions 14. That is, the separation dimension W2 of the top portions of reinforcing ribs 31c furthest away from each other is set to be slightly larger than the separation dimension W1 of the tank-side retaining portions 14, i.e., W2>W1. As a result, some of the reinforcing ribs 31c also serves to fix the washer pump 20 to the washer tank 10.

As shown in FIGS. 5(a) and 6, a magnet supporting portion 31d is provided on the inside of the motor accommodating portion 31 in the radial direction thereof. The magnet supporting portion 31d is provided so as to protrude from the bottom portion BT of the motor accommodating portion 31, and disposed on the inside of the motor accommodating portion 31 in the radial direction thereof with a predetermined gap "S". The magnet supporting portion 31d is formed into a substantially arc-shaped cross section, and configured to support one end side (lower side in FIG. 6) of the pair of magnets 42 in the width direction thereof, which forms part of the motor 40, on both sides (left and right sides in FIG. 6) of the magnet supporting portion 31d in the width direction thereof.

Furthermore, as shown in FIGS. 5(a), 5(b) and 6, a pair of magnet mounting portions 31e is provided on the inside of the motor accommodating portion 31 in the radial direction thereof. The magnet mounting portions 31e are disposed at intervals of 180 degrees so as to face each other about the axial center of the motor accommodating portion 31. Each of the magnet mounting portions 31e is formed into substantially the same shape as the magnet supporting portion 31d, and provided so as to project from the bottom portion BT of the motor accommodating portion 31 in the same manner as that of the magnet supporting portion 31d. Each of the magnet mounting portions 31e is configured to support one end side of the pair of magnets 42 in the height direction thereof, that is, on the lower side in FIG. 4.

Note that a first opening 31f is formed on the opposite side from the bottom along the axial direction of the motor accommodating portion 31, that is, on the upper side in FIG. 4, and the first opening 31f is closed by the motor cover 50. That is, the motor chamber 31a is closed by the motor cover 50. Furthermore, the motor cover 50 and the motor accommodating portion 31 are closely attached to each other by adhesive means such as ultrasonic welding. Therefore, rainwater or the like does not enter the motor accommodating portion 31.

Figure 7:
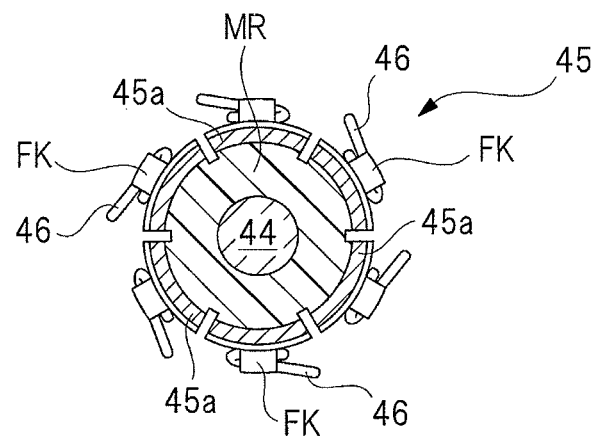
FIG. 7 is a cross-sectional view of the commutator taken along the line A-A of FIG. 4.
Figure 8:
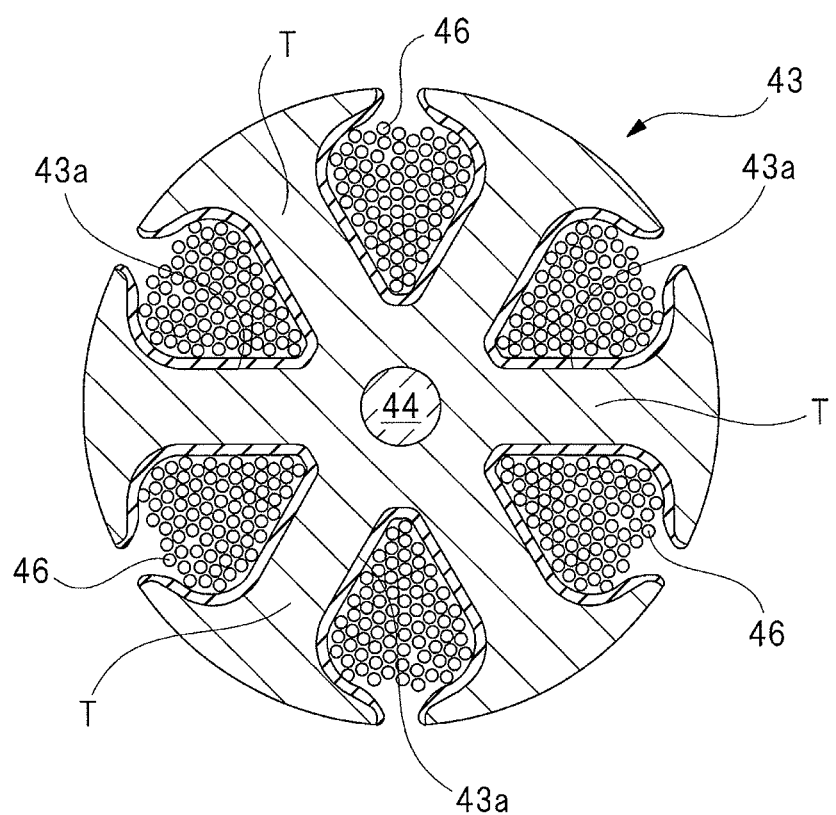
FIG. 8 is a cross-sectional view of the armature core taken along the line B-B of FIG. 4.
Figure 9:
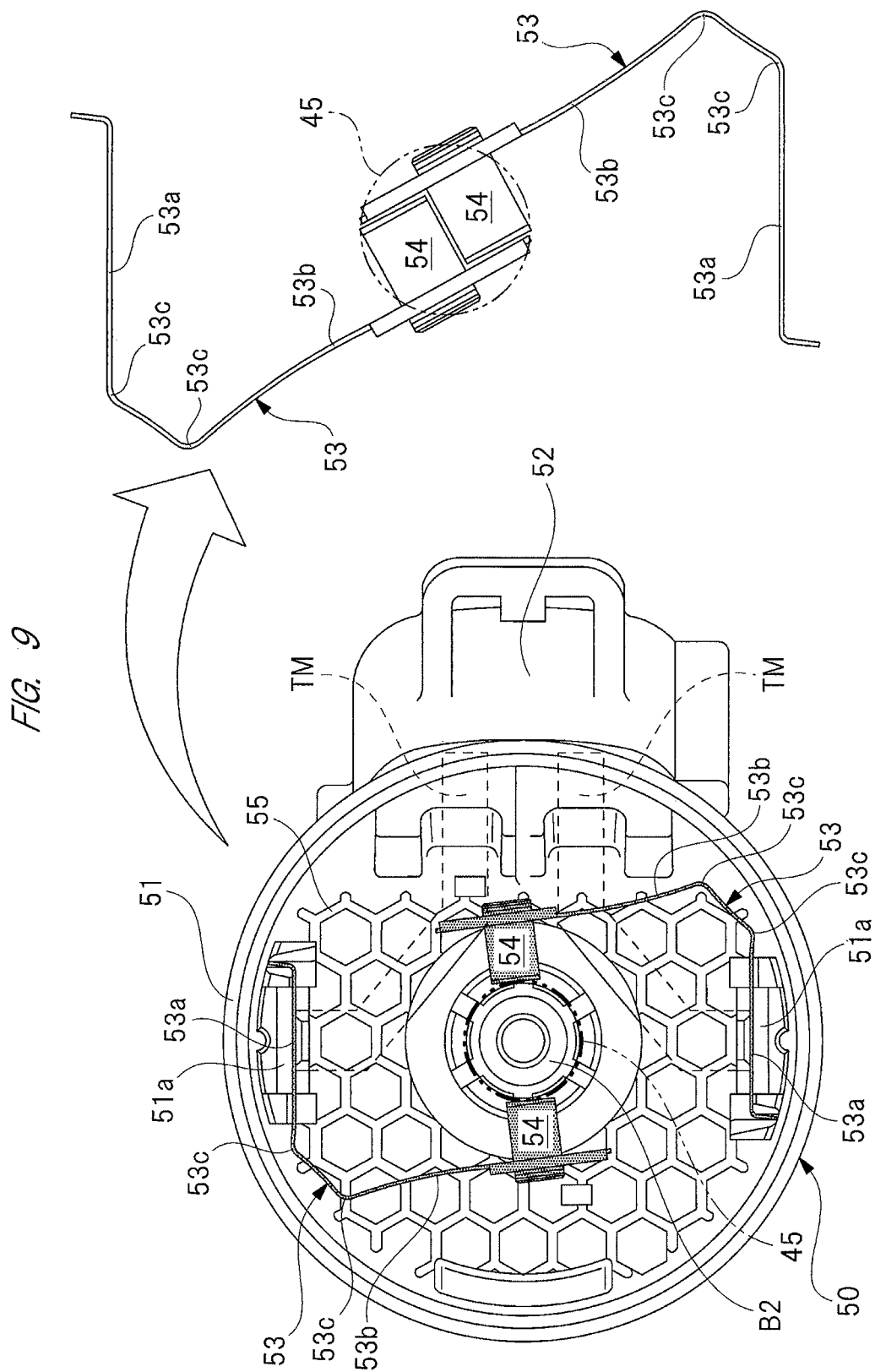
FIG. 9 is an explanatory view showing a brush structure mounted on an inside of a motor cover.

FIG. 7 shows a cross-sectional view of the commutator taken along the line A-A in FIG. 4, FIG. 8 shows a cross-sectional view of the armature core taken along the line B-B in FIG. 4, and FIG. 9 shows an explanatory view explaining a brush structure mounted on the inside of the motor cover.

As shown in FIGS. 4 to 9, a motor 40 is accommodated in the motor accommodating portion 31. Here, the motor 40 includes a motor cover 50 that closes the first opening 31f of the motor accommodating portion 31. The motor 40 includes: a yoke 41 having a generally-cylindrical cross-section formed by pressing a steel plate or the like; and a cut-off portion partially formed along its circumferential direction. As shown in FIGS. 5(a), 5(b) and 6, the outside of the yoke 41 in the radial direction thereof is supported by the support ribs 31b, and the yoke 41 enters the predetermined gap "S". That is, the magnet supporting portion 31d is radially disposed on the inside of the yoke 41.

Note that, as shown in FIG. 6, a notch 41a extending in the axial direction of the yoke 41 is formed, and a positioning protrusion 31g formed on the inside of the motor accommodating portion 31 in the radial direction thereof is inserted into the notch 41a. As a result, the yoke 41 is fixed with the yoke 41 positioned in the circumferential direction of the motor accommodating portion 31. Although not shown in detail, the positioning and fixing of the yoke 41 in the axial direction of the motor accommodating portion 31 is performed by partially contacting the bottom portion BT of the motor accommodating portion 31 with one end side of the yoke 41 in the axial direction (the lower side in FIG. 4). In this manner, the yoke 41 (the motor 40) is fixed on the inside of the motor chamber 31a.

Two (bipolar) magnets (permanent magnets) 42 are fixed to the inside of the yoke 41 in the radial direction thereof. Specifically, the inside of one magnet 42 in the radial direction is magnetized to the "S" pole, and the inside of the other magnet 42 in the radial direction is magnetized to the "N" pole. Each of the magnets 42 is formed into a substantially arc-shaped cross section, and the outside of each magnet in the radial direction thereof is placed in contact with and fixed to the inside of the yoke 41 in the radial direction thereof. That is, the yoke 41 forms a magnetic path through which the lines of magnetic force of the magnets 42 pass.

Note that one end side of each magnet 42 in the height direction thereof is in contact with each magnet mounting portion 31e, and one end side of each magnet 42 in the width direction thereof is in contact with both sides of the magnet supporting portion 31d in the width direction thereof. On the other hand, as shown in FIGS. 5(a) and 5(b), the other end side (upper side in FIG. 4) of each magnet 42 in the height direction thereof is supported by a plurality of support claws 41b formed on the other side (upper side in FIG. 4) of the yoke 41 in the axial direction thereof, and the other end side (upper side in FIG. 6) of each magnet 42 in the width direction thereof is elastically supported by a spring pin SP formed into a substantially U-shape. That is, each magnet 42 is pressed by the spring force of the spring pin SP against the yoke 41.

In this embodiment, the magnet 42 is fixed to the yoke 41 by one spring pin SP and the magnet supporting portion 31d without using two spring pins SP. That is, since the magnet supporting portion 31d is made of non-magnetic material, it does not disturb the magnetic path formed by each magnet 42. Therefore, since each magnet 42 can be further reduced in size, the further reduction in size and weight of the washer pump 20 can be achieved.

As shown in FIGS. 4, 7, and 8, an armature core 43 is rotatably provided on the inside of each magnet 42 in the radial direction thereof through a predetermined air gap. An armature shaft 44 is disposed on the rotation center of the armature core 43, that is, the rotation center of the motor 40 so as to extend and penetrate through the motor 40. That is, the armature shaft 44 rotates together with the armature core 43.

One end side of the armature shaft 44 in the axial direction thereof is rotatably supported by a first bearing B1 mounted on the bottom portion BT of the motor accommodating portion 31, and the other end side of the armature shaft 44 in the axial direction thereof is rotatably supported by a second bearing B2 mounted on the motor cover 50.

In the vicinity of the armature core 43 on the other end side of the armature shaft 44 in the axial direction thereof, a commutator 45 with which two power supply brushes 54 slidably contact is fixed. As shown in FIG. 7, the commutator 45 includes six segments (commutator pieces) 45a in total, and the segments 45a are arranged at equal intervals (60 degrees) in the circumferential direction around the axial center of the armature shaft 44. Furthermore, each segment 45a is solidified by molding resin MR so as to have a substantially cylindrical shape, and coils 46 are hooked on respective hook portions FK of the segments 45a.

The armature core 43 is formed into a substantially cylindrical shape by stacking a plurality of steel plates, and as shown in FIG. 8, a total of six slots 43a are provided so as to correspond to the six segments 45a. In other words, the armature core 43 comprises a total of six teeth "T". In each slot 43a, the coil 46 is wound on the basis of the overlapping winding method. Note that the "overlapping winding" means a winding method in which the coil 46 is wound about the armature shaft 44 so as to form cross-coupled slots 43a which are opposed to each other. That is, in this embodiment, by providing a total of six slots 43a, the mounting of the coil 46 to the armature core 43 can be completed in three winding works by the double flyer method. Therefore, the time required for the winding operation can be shortened, and the cost can be reduced. For the coil 46, a copper wire (e.g., enameled wire) whose outer periphery has been subjected to an insulating treatment is used.

As a result, the armature core 43 rotates in the forward and reverse directions at a predetermined number of revolutions in accordance with the magnitude and orientation of the drive current supplied to each of the power supply brushes 54. One ends of the power supply terminals TM (see FIG. 9) are electrically connected to the respective power supply brushes 54, and the other ends of the power supply terminals TM protrudes into a connector connection 52 provided on the motor cover 50.

As shown in FIGS. 2 to 4 and 9, the motor cover 50 includes a cover main body 51 formed into a predetermined shape by resin material such as plastic, and formed into a substantially disk shape to close the first opening 31f of the motor accommodating portion 31. A connector connection portion 52 formed into a substantially box shape to which a power supply connector (not shown) on the vehicle side is mounted is provided on the outside of the cover main body 51.

A second bearing B2 configured to rotatably support the armature shaft 44 on the other end side in the axial direction is provided on the inside of the cover main body 51 and at the center thereof. A pair of retaining plate fixing parts 51a is provided on the inside of the cover main body 51, and opposed to each other at intervals of 180 degrees with respect to the second bearing B2. These retaining plate fixing parts 51a are arranged in a radially outward portion of the cover main body 51, and the base end portion 53a of the retaining plate 53 is fixed to each retaining plate fixing portion 51a without rattling. That is, the base end portion 53a of the retaining plate 53 is mounted on the inside of the cover main body 51.

Between each retaining plate fixing part 51a of the cover main body 51 and the connector connection pair of power supply terminals TM formed into a bent shape are embedded by insert molding. Each power supply terminal TM supplies a drive current from a power supply connector on the vehicle to each power supply brush 54 via a pair of retaining plates 53. That is, one end side of each power supply terminal TM is electrically connected to each power supply brush 54 via each retaining plate 53. Note that, in the drawing on the left side of FIG. 9, each retaining plate 53 and each power feeding brush 54 are shaded for clarity of illustration.

The retaining plates 53 are formed into the same shape, and formed by bending a long elastic member made of brass or the like into a substantially V-shape. That is, each of the retaining plates 53 has a spring property. One side of the retaining plate 53 in the longitudinal direction is provided with a base end portion 53a fixed to the retaining plate fixing part 51a, and the other side of the retaining plate 53 in the longitudinal direction is provided with a brush retaining portion (tip portion) 53b for retaining a power supply brush 54 formed into a substantially rectangular parallelepiped shape. Two bent portions 53c are provided near the base end portion 53a of the brush retaining portion 53b. That is, two bent portions 53c are provided in a portion near the base end portion 53a along the longitudinal direction of the retaining plate 53.

As described above, by providing the two bent portions 53c to the retaining plate 53 so that they are disposed on the same side as the base end portion 53a of the retaining plate 53, as shown by the imaginary line in FIG. 9, the power feeding brushes 54 can be easily arranged so as to face each other in a space-saving manner across the commutator 45. In addition, by providing the two bent portions 53c to the retaining plate 53 so that they are disposed on the same side as the base end portion 53a of the retaining plate 53, each of the power feeding brushes 54 is in slidable contact with the commutator 45 with an optimal pressing force. Furthermore, by providing the two bent portions 53c to the retaining plate 53 so that they are disposed on the same side as the base end portion 53a of the retaining plate 53, and by setting the bending angle of the bent portion 53c to an optimal value (approximately 90 degrees), the power supply brushes 54 are arranged in the extending direction of the brush retaining portion 53b before assembling the commutator 45, as shown in the right side of FIG. 9. As a result, each of the power supply brushes 54 can be used up to the end. That is, each power supply brush 54 can be reduced in size, and from this point as well, it is advantageous to reduce the size and weight of the washer pump 20. As described above, the motor 40 of this embodiment employs a two-pole, six-slot, two-brush electric motor.

Note that the present invention is not limited to two bent portions 53c provided in a portion closer to the base end portion 53a along the longitudinal direction of the retaining plate 53, and three or more bent portions may be provided.

In this case, the pressing force or the like of each power supply brush 54 against the commutator 45 can be adjusted more finely.

As shown in FIG. 9, a honeycomb-shaped rib 55 is formed on the inside of the cover main body 51. The rib 55 protrudes from the cover main body 51 toward the motor 40 at a predetermined height of about 1.0 mm, and is integrally provided with the cover main body 51. The rib 55 is provided for reinforcing the cover main body 51 in order to cope with thinning of the cover main body 51. When the power supply connector on the vehicle is plugged into and out of the connector connection portion 52, even if a relatively large load acts on the cover main body 51, a sufficient intensity is obtained for the cover main body 51 by providing the rib 55 to the cover main body 51.

Figure 10:
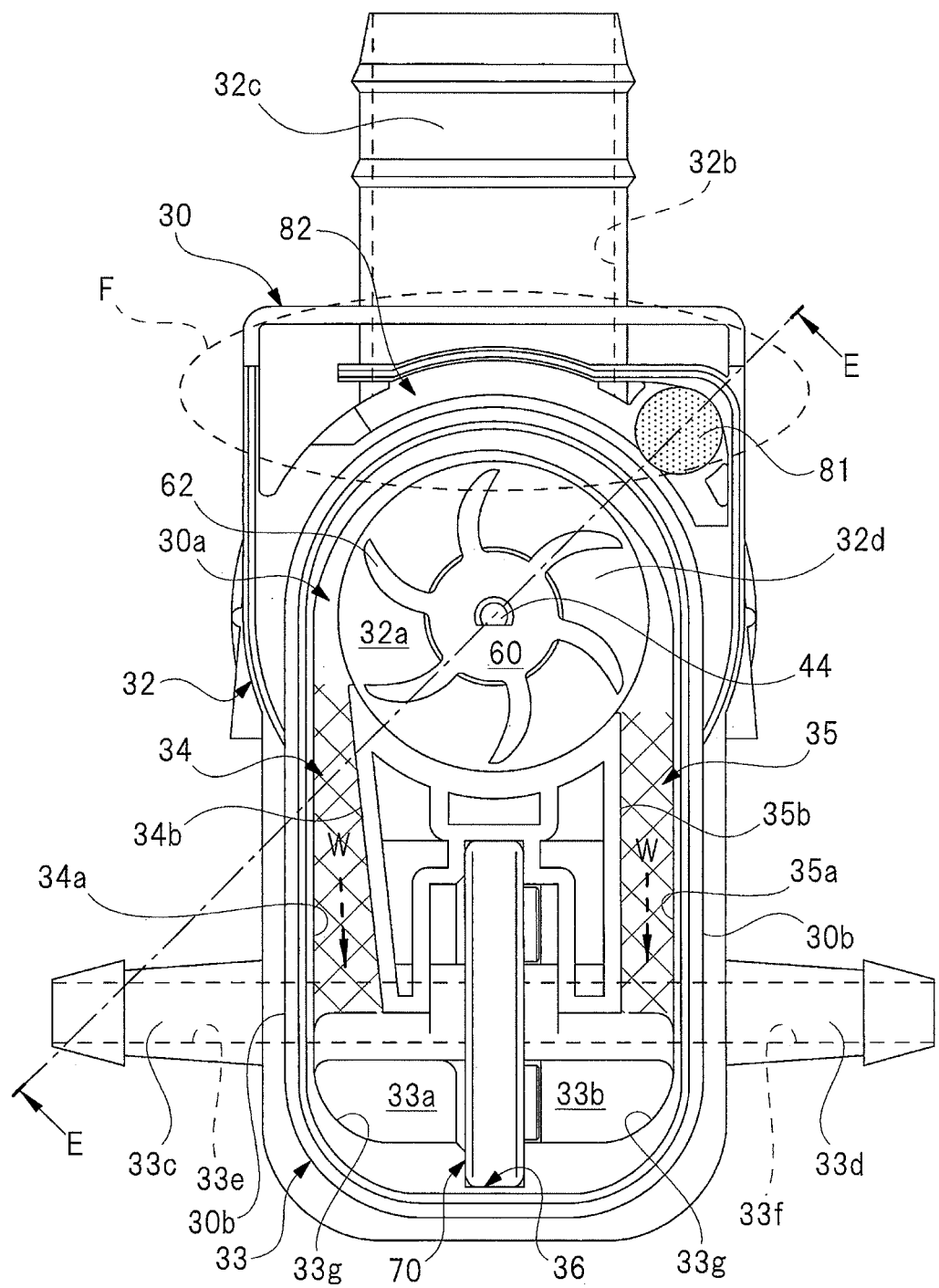
FIG. 10 is a plan view showing a pump chamber (with a cover member omitted) of the washer pump.
Figure 11:
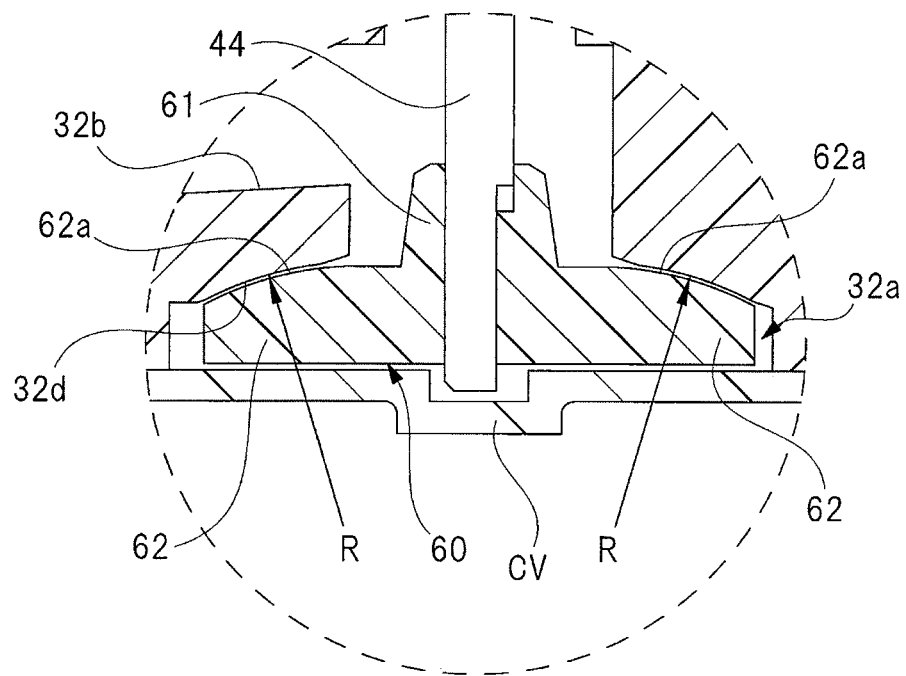
FIG. 11 is an enlarged view showing a portion surrounded by the dashed circle "C" of FIG. 4.
Figure 12:
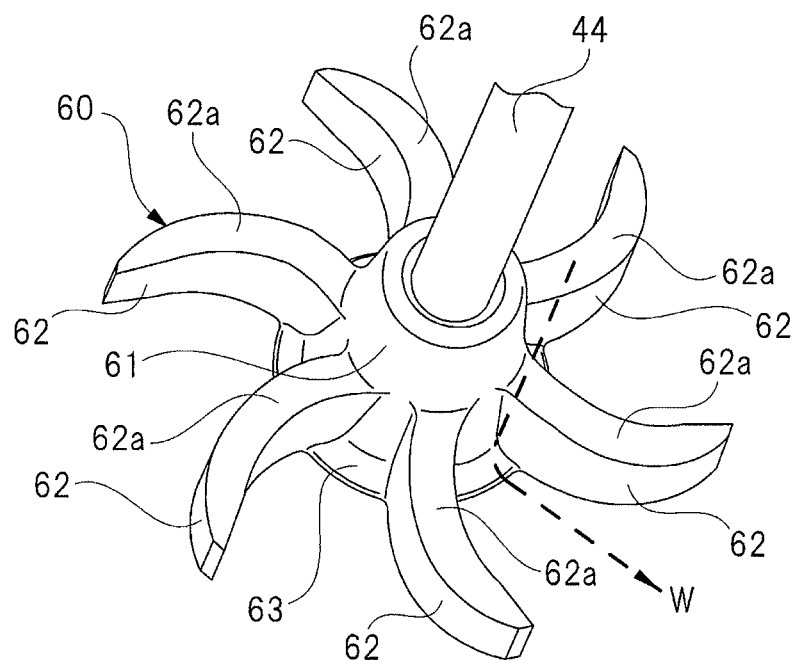
FIG. 12 is a perspective view showing a detailed structure of an impeller.

FIG. 10 is a plan view showing the washer pump from the same side as the pump chamber (with the cover member omitted), FIG. 11 is an enlarged view of a portion surrounded by the dashed circle "C" of FIG. 4, and FIG. 12 is a perspective view showing the detailed structure of the impeller.

As shown in FIGS. 4 and 10 to 12, an impeller 60 is rotatably fixed to one end side of the armature shaft 44 in the axial direction thereof. The impeller 60 and the armature shaft 44 are fixed by fitting in a so-called D-cut shape so that they cannot rotate relative to each other. That is, the impeller 60 is rotated by the motor 40. As shown in FIG. 12, the impeller 60 includes: an impeller body 61 fixed to the armature shaft 44; and a total of six vanes 62 extending radially from the impeller body 61 and curved in a substantially crescent shape.

As shown in FIG. 11, bowl-shaped convex portions 62a formed into an arc shape with a predetermined radius of curvature "R" are formed on the same side of the six vanes 62 as the armature core 43 (on the same side as a bowl-shaped recess 32d) along the axial direction of the armature shaft 44. The bowl-shaped convex portions 62a are provided along the bowl-shaped recess 32d of a pump chamber 32a. Note that the radius of curvature of the bowl-shaped recess 32d of the pump accommodating portion 32 is set to "R", whereby the impeller 60 faces the bowl-shaped recess 32d with a predetermined gap formed between the impeller 60 and the bowl-shaped recess 32d. As described above, by arranging two bowl-shaped recess 32d the same in radius of curvature as each other so that they extend along bowl-shaped convex portions 62a, some axial deviation of the impeller 60 with respect to the bowl-shaped recess 32d is allowed, and their clearance is reduced to prevent deterioration of the pump capacity.

Furthermore, between the impeller body 61 and the six vanes 62, an annular flange portion 63 is formed. This flange portion 63 is disposed on the downstream side of the impeller main body 61 along the flow direction of the cleaning liquid "W" (dashed arrow in FIG. 12). As a result, as indicated by the dashed arrow in FIG. 12, the cleaning liquid "W" is promptly directed to the distal end of each vane 62, thereby improving the pumping capacity.

As shown in FIGS. 4, 10, and 11, the pump accommodating portion 32 includes a pump chamber 32a and a cleaning liquid inflow hole 32b provided upstream of the pump chamber 32a, i.e., on the washer tank 10. Note that the cleaning liquid inflow hole 32b is formed into the suction pipe 32c, and inserted into the insertion hole 15 of the washer tank 10. As shown in FIG. 4, the flow passage area of the cleaning liquid inflow hole 32b is gradually decreased from the washer tank 10 toward the pump chamber 32a. As a result, the flow rate of the cleaning liquid "W" sucked into the cleaning liquid inflow hole 32b is increased, so that the cleaning liquid "W" can be efficiently sucked into the pump chamber 32a.

The pump chamber 32a is formed into a flat shape in which the impeller 60 is rotatably accommodated with a predetermined gap between them, and has a bowl-shaped recess 32d whose radius of curvature is set to "R". The opening portions of the pump chamber 32a and the valve chambers 33a and 33b form a second opening 30a of the housing 30, and the second opening 30a is closed by a cover member CV. The second opening 30a is also formed on the same side as a respiratory hole 80 of the housing 30, which will be described later. The portion of the second opening 30a where the respiratory hole 80 is provided is also closed by the cover member CV. Note that the cover member CV is formed into a substantially flat plate shape from resin material such as plastic, and firmly fixed to the housing 30 by ultrasonic welding or the like.

Furthermore, as shown in FIG. 4, an armature shaft 44 is disposed so as to cross the downstream side of the cleaning liquid inflow hole 32b, that is, the same side as the pump chamber 32a. Therefore, a lip seal LS made of rubber or the like is provided between the cleaning liquid inflow hole 32b and the armature shaft 44. As a result, the cleaning liquid "W" flowing through the cleaning liquid inflow hole 32b is prevented from leaking into the motor chamber 31a.

Furthermore, when the polarity of the pair of power supply brushes 54 is reversed so as to rotate the motor 40 in the forward or reverse directions, the impeller 60 is also rotated in the forward or reverse directions inside the pump chamber 32a. At this time, the cleaning liquid "W" flowing through the cleaning liquid inflow hole 32b is sucked into the pump chamber 32a regardless of the rotation direction of the impeller 60.

Figure 15:
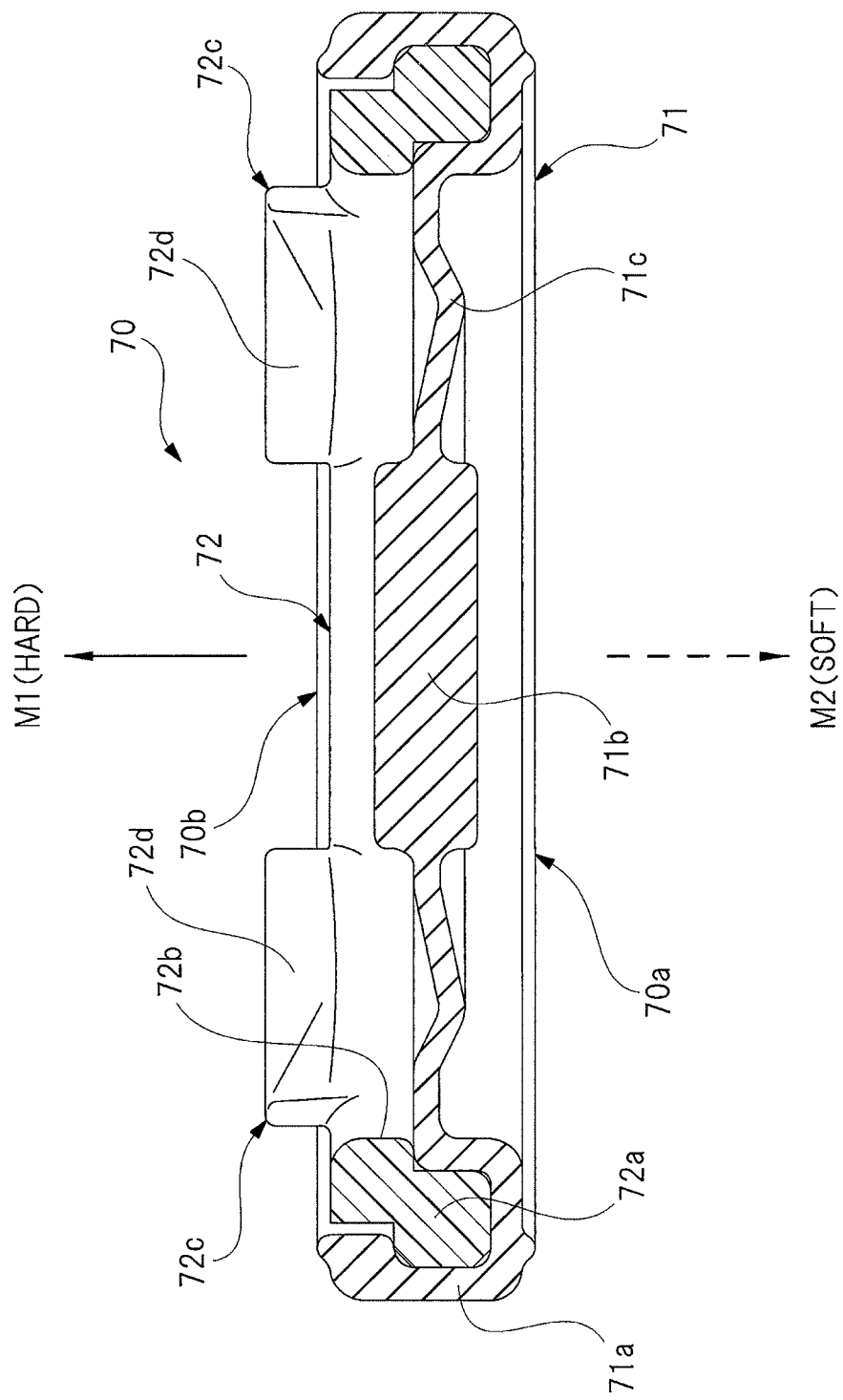
FIG. 15 is a cross-sectional view taken along the line D-D of FIG. 14(a)

FIGS. 13(a) and 13(b) show cross-sectional views each showing the position of the discharge hole with respect to the opening of the valve chamber, FIGS. 14(a) and 14(b) show perspective views each showing the valve unit, and FIG. 15 shows a cross-sectional view along the D-D line of FIG. 14(a).

As shown in FIGS. 4, 10, and 13, the valve body accommodating portion 33 includes a front-side valve chamber (valve chamber) 33a and a rear-side valve chamber (valve chamber) 33b which are disposed on the opposite side of the pump chamber 32a from the cleaning liquid inflow hole 32b. That is, the cleaning liquid "W" discharged from the pump chamber 32a flows into the pair of valve chambers 33a and 33b. In the valve body accommodating portion 33, a front-side discharge pipe 33c is integrally provided so as to correspond to the front-side valve chamber 33a, and a rear-side discharge pipe 33d is integrally provided so as to correspond to the rear-side valve chamber 33b.

The cleaning liquid "W" flowing into the front-side valve chamber 33a flows out to the front-side discharge hole 33e on the inside of the front-side discharge pipe 33c via the valve unit 70. The cleaning liquid "W" flowing into the rear-side valve chamber 33b flows out to the rear-side discharge hole 33f on the inside of the rear-side discharge pipe 33d via the valve unit 70. Note that the front-side discharge holes 33e and the rear-side discharge holes 33f constitute a pair of discharge holes in the present invention.

As shown in FIG. 10, a front-side passage 34 is provided between the pump chamber 32a and the front-side valve chamber 33a. A rear-side passage 35 is provided between the pump chamber 32a and the rear-side valve chamber 33b. As described above, the motor accommodating portion 31, the pump chamber 32a, the pair of valve chambers 33a and 33b, the pair of discharge holes 33e and 33f, and the pair of flow paths 34 and 35 are integrally provided in one housing 30. The cleaning liquid "W" flows into each of the valve chambers 33a and 33b in accordance with the corresponding rotation direction of the impeller 60.

Specifically, by rotating the impeller 60 in the counterclockwise direction, the cleaning liquid "W" flows from the pump chamber 32a toward the front-side flow path 34. On the other hand, by rotating the impeller 60 in the clockwise direction, the cleaning liquid "W" flows from the pump chamber 32a toward the rear-side flow path 35. Note that since each vane 62 of the impeller 60 is formed into a substantially crescent shape, the flow rate of the cleaning liquid "W" flowing out through the front-side flow path 34 is higher than that of the cleaning liquid "W" flowing out through the rear-side flow path 35 even if the rotation speeds of the motor 40 in the forward and reverse directions is the same as each other. Since the cleaning liquid "W" toward the front-side windshield is affected by winds as compared with the cleaning liquid "W" toward the rear-side windshield, and it is necessary to increase the injection pressure of the cleaning liquid "W". That is, in the washer pump 20 of this embodiment, the target position of the cleaning liquid "W" on the front-side windshield is substantially prevented from being affected by winds while the vehicle is moving.

As shown in FIG. 10, on the same side as the front-side valve chamber 33a along the longitudinal direction of the front-side flow path 34, the front-side flow path 34 extends to the front-side discharge hole 33e, and on the same side as the rear-side valve chamber 33b along the longitudinal direction of the rear-side flow path 35, the rear-side flow path 35 extends to the rear-side discharge hole 33f. More specifically, the cross-hatched areas in FIG. 10 correspond to the front-side flow path 34 and the rear-side flow path 35. As a result, the cleaning liquid "W" from the front-side flow path 34 and the rear-side flow path 35 is discharged to the front-side valve chamber 33a and the rear-side valve chamber 33b, each of which is narrower than those in the past, and therefore, rapid diffusion of the cleaning liquid "W" into the valve chambers 33a and 33b is suppressed.

The front valve chamber 33a and the rear valve chamber 33b are each provided with a curved wall portion 33g. These curved wall portions 33g are formed in front of the outlet portions of the front-side flow path 34 and the rear-side flow path 35, and the cleaning liquid "W" discharged from the front-side flow path 34 and the rear-side flow path 35 is rectified so as to flow along the respective curved wall portions 33. In this manner, rapid diffusion of the cleaning liquid "W" into the valve chambers 33a and 33b is suppressed, and turbulent flow of the cleaning liquid "W" in the valve chambers 33a and 33b is suppressed by rectifying the cleaning liquid "W" in the valve chambers 33a and 33b.

As shown in FIG. 10, the front-side flow path 34 and the rear-side flow path 35 are different in shape from each other. However, the cross-sectional shape of each of the flow paths 34 and 35 in the direction intersecting the longitudinal direction is formed into a substantially rectangular shape, and the flow paths 34 and 35 are the same in depth as each other. Note that the front-side flow path 34 constitutes one flow path in the present invention, and the rear-side flow path 35 constitutes the other flow path in the present invention.

The flow passage area of the front-side flow path 34 on the same side as the pump chamber 32a along the longitudinal direction is set to be smaller than the flow passage area of the front-side flow path 34 on the same side as the front-side valve chamber 33a along the longitudinal direction. More specifically, as shown in FIG. 10, an outer wall portion 34a disposed on the outside of the front-side flow path 34 (i.e., on the left side in the drawing) is provided in parallel with the side wall 30b of the housing 30, and nearer the side wall 30b. The inner wall portion 34b disposed on the inside of the front-side flow path 34 (i.e., on the right side in the drawing) is provided on the inside of the side wall 30b of the housing 30, and inclined with respect to the side wall 30b.

As described above, the flow passage area of the inner wall portion 34b gradually increases from the pump chamber 32a to the front valve chamber 33a of the front-side flow path 34. That is, the inner wall portion 34b constitutes an inclined wall in the present invention. Furthermore, as shown in FIG. 10, the outer wall portion 34a opposed to the inner wall portion 34b constitutes an opposed wall in the present invention.

As a result, the front-side flow path 34 is narrowed toward the pump chamber 32a along the longitudinal direction thereof, and the flow rate of the cleaning liquid "W" flowing from the pump chamber 32a to the front-side flow path 34 is increased. Therefore, the flow of the cleaning liquid "W" to the front-side valve chamber 33a is smoothed, and rapid diffusion of the cleaning liquid "W" into the front-side valve chamber 33a is suppressed. As described above, the front-side flow path 34 is provided in order to deal with the cleaning liquid "W" to be outputted toward the front-side windshield of the vehicle. That is, the washer pump 20 of this embodiment employs a structure suitable for the front-side necessary to increase the output pressure of the cleaning liquid "W".

On the other hand, it is not necessary that the injection pressure of the cleaning liquid "W" on the rear-side is set to be as large as the injection pressure of the cleaning liquid "W" on the front-side. For this reason, the flow passage area on the same side as the pump chamber 32a along the longitudinal direction of the rear-side flow path 35 and the flow passage area on the same side as the rear-side valve chamber 33b along the longitudinal direction of the rear-side flow path 35 are set to be the same as each other, thereby giving priority to easily manufactured structure of the housing 30 and the like. Specifically, as shown in FIG. 10, the lateral wall portion 35a disposed on the outside of the rear-side flow path 35 (on the right side in the drawing) and the inner wall portion 35b disposed on the inside of the rear-side flow path 35 (on the left side in the drawing) are parallel to each other, and both are parallel to the side wall 30b of the housing 30.

Note that the flow passage area of the front-side flow path 34 on the same side as the pump chamber 32a is set smaller than the flow passage area of the rear-side flow path 35 on the same side as the pump chamber 32a. On the other hand, the flow passage area of the front-side flow path 34 on the same side as the front-side valve chamber 33a is set to be larger than the flow passage area of the rear-side flow path 35 on the same side as the rear-side valve chamber 33b. Specifically, the length of the inner wall portion 34b from the front-side valve chamber 33a to the pump chamber 32a is longer than the length of the inner wall portion 35b from the rear-side valve chamber 33b to the pump chamber 32a.

As described above, by changing a pumping capacity in accordance with the rotation of the motor 40 in the positive direction or the reverse direction, and by changing the shape of the front-side flow path 34 and the rear-side flow path 35, the volume of the cleaning liquid "W" is larger and its flow rate is higher in the front-side flow path 34 than in the rear-side flow path 35.

As shown in FIG. 10, a valve accommodation chamber 36 is provided between the front-side valve chamber 33a and the rear-side valve chamber 33b along the extending direction of the front-side discharge pipe 33c and the rear-side discharge pipe 33d. A diaphragm type valve unit 70 is mounted in the valve accommodating chamber 36. That is, the valve unit 70 partitions it into the pair of valve chambers 33a and 33b. The valve main body 71b of the switching valve 71 constituting the valve unit 70 (see FIG. 15) is disposed between the front-side discharge pipe 33c and the rear-side discharge pipe 33d, and movable on the same side as the front-side discharge pipe 33c or the rear-side discharge pipe 33d, that is, in the extending direction of each of the discharge pipes 33c and 33d.

Note that the front-side discharge hole 33e and the rear-side discharge hole 33f are respectively disposed in the moving directions of the valve main body 71b of the switching valve 71, and the valve main body 71b of the switching valve 71 opens the front-side discharge pipe 33c and closes the rear-side discharge pipe 33d when the inner pressure of the front-side valve chamber 33a becomes high. As a result, the cleaning liquid "W" flows only through the front-side discharge hole 33e, and is then jetted toward the front-side windshield. On the other hand, the valve main body 71b of the switching valve 71 opens the rear-side discharge pipe 33d and closes the front-side discharge pipe 33c when the inner pressure of the rear-side valve chamber 33b becomes high. As a result, the cleaning liquid "W" flows only through the rear-side discharge hole 33f, and is then jetted toward the rear-side windshield.

Furthermore, the valve unit 70 is mounted so as to face in a predetermined direction in the valve accommodating chamber 36. That is, the valve unit 70 has an assembly direction with respect to the valve accommodation chamber 36.

As shown in FIG. 13(a), a front-side discharge hole 33e is opened in the front-side valve chamber 33a, and a first facing surface 36a to which one side surface 70a (see FIG. 15) of the valve unit 70 is opposed is provided around the front-side discharge hole 33e. Between the front valve chamber 33a and the first opposing surface 36a, a pair of curved portions 36b is provided for rectifying the cleaning liquid "W" flowing in the front valve chamber 33a toward the center of the front discharge hole 33e, that is, the valve main body 71b.

As shown in FIG. 13(b), a rear-side discharge hole 33f is opened in the rear-side valve chamber 33b, and a second opposing surface 36c, to which the other side surface 70b (see FIG. 15) of the valve unit 70 is opposed, is provided around the rear-side discharge hole 33f. Note that, between the rear-side valve chamber 33b and the second opposing surface 36c, a pair of curved portions 36d for rectifying the cleaning liquid "W" flowing in the rear-side valve chamber 33b toward the rear-side discharge hole 33f, that is, toward the center of the valve main body 71b is provided.

Furthermore, the second opposing surface 36c is provided with a pair of recessed portions (recessed portions) 36e with which the erroneous assembly operation prevention protrusions 72c (see FIG. 15) provided on the other side surface 70b of the valve unit 70 are engaged. These recessed portions 36e are recessed toward the rear-side discharge pipe 33d (see FIG. 10). That is, each of the recessed portions 36e is provided to be recessed on one side of the valve body 71 in the moving direction thereof.

Note that the recessed portions 36e are not provided to the front-side valve chamber 33a (see FIG. 13(a)). That is, with one side surface 70a of the valve unit 70 opposed to the second opposed surface 36c and the other side surface 70b of the valve unit 70 opposed to the first opposed surface 36a, the erroneous assembly operation preventing projection 72c is eliminated. Therefore, the valve unit 70 protrudes from the valve accommodation chamber 36, and is in a state in which it is not correctly assembled, that is, in a "wrong assembled state".

As described above, when the valve unit 70 is incorrectly assembled in the valve accommodating chamber 36, the erroneous assembly operation prevention mechanism including the recessed portion 36e and each erroneous assembly operation preventing protrusion 72c can cause the valve unit 70 to protrude from the valve accommodating chamber 36, and consequently, the assembler or the like to easily grasp (notify) the "incorrect assembly state" in appearance. This makes it possible to reliably prevent the valve unit 70 from being erroneously assembled in the valve accommodation chamber 36.

Note that, as shown in FIGS. 13(a) and 13(b), the distance between the center of the front-side discharge hole 33e and the rear-side discharge hole 33f and the lower end 30c of the second opening 30a of the housing 30 is set to "H". The distance "H" is larger than the diameter dimension "D" (see FIG. 2) of the thickest portion of the front-side discharge pipe 33c and the rear-side discharge pipe 33d (H>D). As a result, each of the discharge pipes 33c and 33d (each of the discharge holes 33e and 33f) is disposed closer to the motor accommodating portion 31 (upward side in the drawing) than the lower end 30c of the housing 30. Specifically, as shown in FIG. 4, the pair of discharge holes 33e and 33f is provided closer to the motor chamber 31a than the lower end of the intake pipe 32c in the axial direction of the motor 40, and closer to the cover member CV than the upper end of the suction pipe 32c in the axial direction of the motor 40. This makes it possible to reduce the height of the washer pump 20 in the axial direction of the motor 40. Therefore, it is possible to realize the washer pump 20 reduced in size and weight while suppressing the complexity of the shape of the washer pump 20.

As shown in FIGS. 14 and 15, the valve unit 70 is formed into a substantially square plate shape. The valve unit 70 includes a switching valve (valve body) 71 formed by thinning a rubber material or the like, and a frame body 72 mounted on the switching valve 71 and reinforcing the switching valve 71. In FIGS. 14(a) and 14(b), in order to clearly distinguish the switching valve 71 from the frame 72, the frame 72 is shaded.

The switching valve 71 includes a mounting portion 71a formed into a substantially square shape when viewed from the moving direction of the valve main body 71b. The mounting portion 71a is adapted to be mounted to the valve housing chamber 36 (see FIG. 10). Here, although not shown in detail, the mounting portion 71a of the switching valve 71 is also mounted on the inside of the cover member side housing portion CM (see FIG. 3) provided in the cover member CV.

As shown in FIG. 15, the mounting portion 71a is formed into a generally U-shaped cross-section and a portion of the body portion 72a of the frame 72 is mounted therein. That is, the main body portion 72a supports the mounting portion 71a, whereby the mounting portion 71a is reinforced by the main body portion 72a to prevent the mounting portion 71a from being deformed or tilted when the mounting portion 71a is mounted to the valve accommodation chamber 36 or the like.

A valve main body 71b formed into a substantially disk shape is provided on the inside of the mounting portion 71a in the radial direction thereof. The valve main body 71b is moved in the extending direction of each of the discharge pipes 33c and 33d in accordance with the inner pressure of each of the valve chambers 33a and 33b. As a result, the front-side discharge pipe 33c and the rear-side discharge pipe 33d open and close by both sides in the thickness direction of the valve main body 71b.

Between the valve main body 71b and the mounting portion 71a, an annular thin-walled portion 71c which is deformed when the valve main body 71b moves is provided. As shown in FIG. 15, the thin-walled portion 71c is thinner than the valve main body 71b, and has a bent cross-section. This makes it possible to easily move the valve main body 71b and to reliably open and close each of the discharge pipes 33c and 33d.

The frame body 72 is formed of plastic or the like having a rigidity higher than that of the switching valve 71, so that the mounting portion 71a of the switching valve 71 can be sufficiently reinforced. The frame body 72 includes a main body portion 72a formed into a substantially square shape (as viewed from the moving direction of the valve main body 71b), and part of the main body portion 72a is mounted on the inside of the mounting portion 71a. A circular hole 72b having an inner diameter substantially the same as the outer diameter of the thin-walled portion 71c of the switching valve 71 is provided on the inside of the main body portion 72a in the radial direction. As a result, the valve main body 71b is movable radially on the inside of the circular hole 72b without being hindered by the frame 72.

At the four corners of the main body portion 72a, erroneous assembly operation preventing projections (convex portions) 72c are provided, respectively. As shown in FIG. 15, these erroneous assembly operation preventing projections 72c project from the other side surface 70b of the valve unit 70. That is, each of the erroneous assembly operation preventing projections 72c is provided so as to project toward one side in the moving direction of the valve main body 71b. Note that the outside of the erroneous assembly operation preventing projection 72c along the radial direction of the frame 72 is engaged with the inside of the recessed portion 36e along the radial direction of the frame 72, and in the case of such an engaged relationship, the valve unit 70 is in a correctly assembled state without protruding from the valve accommodation chamber 36.

The erroneous assembly operation preventing projections 72c provided at the four corners of the main body portion 72a are disposed radially outward of the circular hole 72b, and do not hinder the movement of the valve main body 71b. In other words, each of the erroneous assembly operation preventing projections 72c is provided in the dead space of the main body portion 72a. Note that the frame body 72 cannot be assembled to the switching valve 71 so that the erroneous assembly operation preventing protrusions 72c face the thin-walled portion 71c. That is, each of the erroneous assembly operation preventing projections 72c also has an erroneous assembly operation prevention function of the valve unit 70.

As shown in FIGS. 14(a) and 14(b), the erroneous assembly operation preventing projection 72c is formed into a substantially triangle shape in plan view, and has a circular hole 72b, that is, an inclined surface 72d gradually falling toward the center of the valve main body 71b. Note that the erroneous assembly operation preventing projections 72c are exposed at four corners (not shown) in the rear-side valve chamber 33b, respectively, with the valve unit 70 mounted in the valve accommodation chamber 36. Therefore, by providing each of the erroneous assembly operation preventing projections 72c with the inclined surface 72d, the rectifying effect of the cleaning liquid "W" flowing in the rear-side valve chamber 33b is not lowered. That is, each of the inclined surfaces 72d serves to direct the orientation of the cleaning liquid "W" flowing in the rear-side valve chamber 33b to the valve main body 71b. As described above, in the erroneous assembly operation preventing projection 72c, the inclined surface 72d formed on the side of the recessed portion 36e along the moving direction of the valve main body 71b guides the flow of the cleaning liquid "W" toward the center of the valve main body 71b.

Note that, as shown in FIG. 15, the hardness of the movement differs depending on the movement direction of the valve main body 71b. That is, the valve main body 71b moves in the direction of the solid arrow M1 (upward in the figure), and the movement in the direction of the dashed arrow M2 (downward in the figure) is soft. More specifically, when moving in the direction of the solid arrow M1, the movement or deflection of the thin-walled portion 71c is hindered by the main body portion 72a, but when moving in the direction of the broken arrow M2, the movement or deformation of the thin-walled portion 71c is not hindered by the main body portion 72a. As a result, the hardness of the movement differs depending on the movement direction of the valve main body 71b. The movement of the valve main body 71b in the hard direction is the front-side, and the movement of the valve main body 71b in the soft direction is the rear-side. As a result, the cleaning liquid "W" is injection to the windshield on the rear-side with a weak injection pressure, and the wide area of the windshield on the rear-side can be uniformly wetted with the cleaning liquid "W".

As described above, in the washer pump 20 of this embodiment, the injection pressure of the cleaning liquid "W" is optimized between the front-side and the rear-side by providing a difference in injection pressure of the cleaning liquid "W" between the front-side and the rear-side. Therefore, the valve unit 70 is provided with assembly directionality. Therefore, four erroneous assembly operation preventing projections 72c are provided to the valve unit 70, and a pair of recessed portions 36e is provided to the rear-side valve chamber 33b, thereby preventing the washer pump 20 from being erroneously assembled. That is, by providing an erroneous assembling prevention mechanism composed of the recessed portion 36e and the erroneous assembly operation preventing projection 72c between the housing 30 and the frame 72, the yield in the assembly process of the washer pump 20 is improved.

Figure 16:
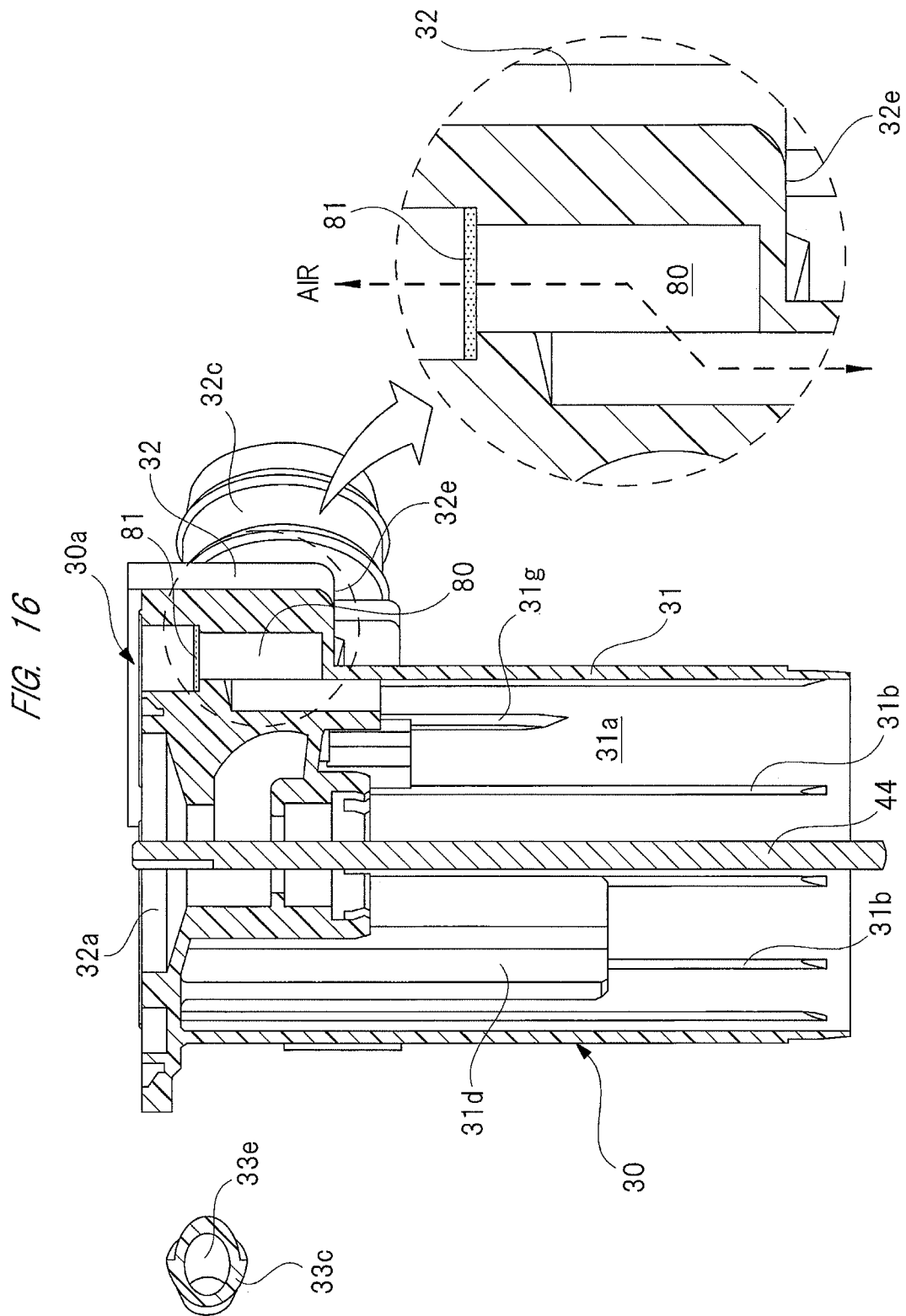
FIG. 16 is a cross-sectional view of a housing taken along the line E-E of FIG. 10.
Figure 17:
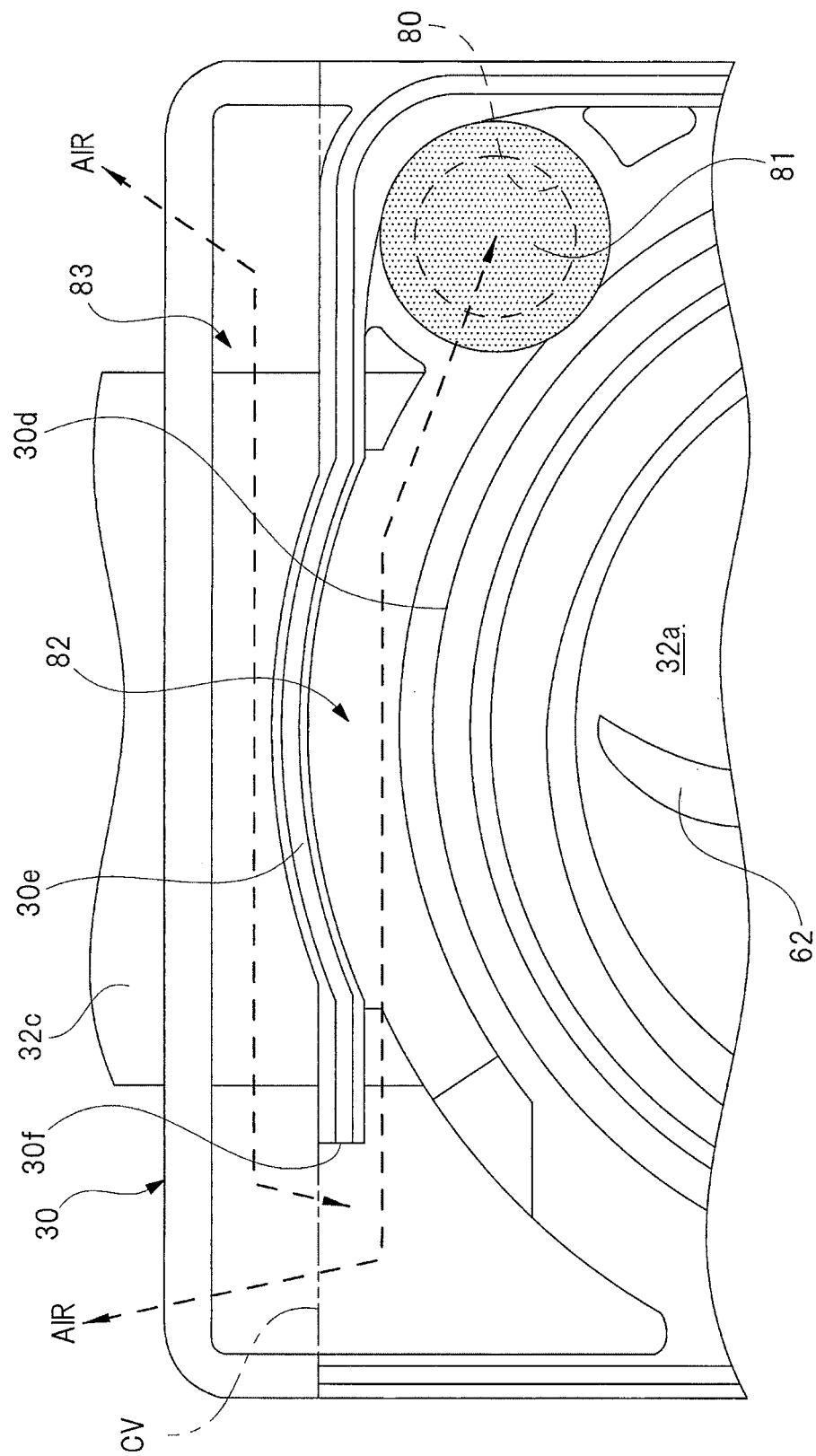
FIG. 17 is a partial enlarged view showing a portion surrounded by the dashed circle "F" of FIG. 10.
Figure 18:
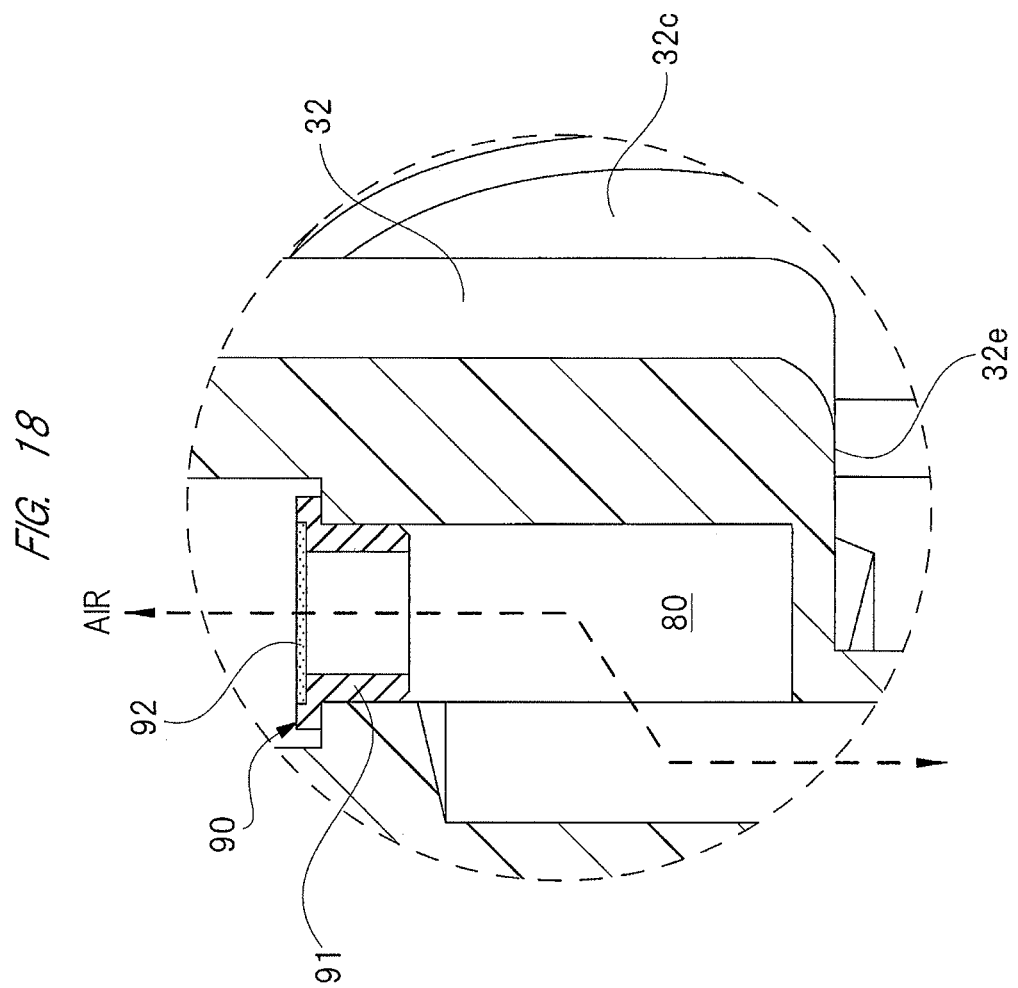
FIG. 18 is a partially enlarged cross-sectional view showing a modification of the porous filter.

FIG. 16 is a cross-sectional view of the housing taken along line E-E of FIG. 10, FIG. 17 is an enlarged partial view of the dashed circle "F" of FIG. 10, and FIG. 18 is an enlarged partial cross-sectional view showing a modification of the porous filter.

As shown in FIGS. 1 and 2, the motor accommodating portion 31 formed into a substantially cylindrical shape is held by a pair of tank side retaining portions 14 provided in the washer tank 10, whereby the washer pump 20 is attached to the washer tank 10. Therefore, a dead space DS having a substantially triangular shape is formed between the washer tank 10 having a flat surface and the motor accommodating portion 31 having a circular arc surface, as shown by the dashed circle in FIG. 2. A corner portion 32e is provided in a portion of the pump accommodating portion 32, which corresponds to the dead space DS. That is, the corner portion 32e is disposed in the housing 30 between the motor accommodating portion 31 and the washer tank 10 with the washer pump 20 mounted on the washer tank 10.

As shown in FIGS. 16 and 17, a respiratory hole 80 is provided between the motor accommodating portion 31 and the corner portion 32e to communicate the inside of the motor accommodating portion 31 with its outside. More specifically, one end side (lower side in FIG. 16) of the breathing hole 80 opens to the inside of the motor accommodating portion 31, and the other end side (upper side in FIG. 16) of the breathing hole 80 opens to the inside of the corner portion 32e. As a result, the respiratory hole 80 communicates the motor chamber 31a in the motor accommodating portion 31 with the outside of the housing 30. The respiratory hole 80 is disposed in the corner portion 32e located in the dead space DS (see FIG. 2) of the pump housing portion 32, but is not in communication with the pump chamber 32a.

The respiratory hole 80 extends in the axial direction of the motor accommodating portion 31, and is formed into a stepped shape, as shown in a partially enlarged view within the dashed circle of FIG. 16. Thus, air (AIR) can flow between the corner portion 32e (outside the housing 30) outside the motor accommodating portion 31 and in the dead space DS of the pump accommodating portion 32 and the motor chamber 31a in the motor accommodating portion 31.

Note that the air in the motor accommodating portion 31 is expanded by the heat generated when the motor 40 is operated. Therefore, in order to properly operate the motor 40, a "respiratory structure" for moving air (AIR) between the motor chamber 31a in the motor accommodating portion 31 and the outside of the housing 30 is required. However, in order to provide this respiratory structure, when a housing of a dedicated design having only a breathing hole is used, the housing may become larger in size. Therefore, in the washer pump 20 of this embodiment, the respiratory hole 80 is arranged in the corner portion 32e of the housing 30, which may be the dead space DS as described above.

Therefore, the housing 30 does not become unnecessarily large, and a sufficient respiratory function can be provided. Furthermore, it is possible to arrange the respiratory hole 80 within the outer range including the washer pump 20 and the washer tank 10 with the washer pump 20 attached to the washer tank 10.

As shown in FIGS. 10, 16, and 17, a porous filter 81 configured to regulate the passage of water and to allow the passage of air is mounted on the same side of the respiratory hole 80 as the second opening 30a. The porous filter 81 is disposed so as to close the respiratory hole 80, and the outer peripheral portion thereof is fixed to the inside of the corner portion 32e (housing 30) by ultrasonic welding or the like. On the other hand, instead of ultrasonic welding, the outer peripheral portion thereof may be fixed to the inside of the corner portion 32e (housing 30) by using double-sided tape, adhesive, or the like.

As shown in FIGS. 10 and 17, on the outside of the pump chamber 32a and upstream side (outside of the housing 30) of the porous filter 81 provided in the respiratory hole 80, the housing 30 is provided with a first ventilation passage 82 that extends throughout the housing 30 the width direction along the extending direction of each of the discharge tubes 33c and 33d. That is, the first ventilation passage 82 is provided so as to extend in the width direction of the housing 30 crossing the intake direction (vertical direction in FIG. 17) of the cleaning liquid "W", and one end side (right side in FIG. 17) of the first ventilation passage 82 communicates with the other end side of the respiratory hole 80.

The first air passage 82 is formed between the arc-shaped wall 30d of the housing 30 forming the pump chamber 32a, the outer wall 30e of the housing 30 provided on the outside of the arc-shaped wall 30d in the radial direction, and the cover member CV (see FIG. 3). That is, part of the inside of the corner portion 32e, the porous filter 81 provided on the inside of the corner portion 32e so as to block the respiratory hole 80, and the first ventilation passage 82 are each covered by a cover member CV which blocks the second opening 30a of the housing 30. As a result, the respiratory hole 80, the porous filter 81, and the first ventilation passage 82 cannot be seen from the axial direction of the armature shaft 44, and hidden by the cover member CV, as shown in FIG. 3.

Furthermore, a cut-out portion 30f formed by partially cutting the outer wall 30e is disposed on the other side (left side in FIG. 17) of the width direction of the housing 30 that intersects the intake direction of the cleaning liquid "W". As a result, air (AIR) flows between the outside of the housing 30 and the respiratory hole 80 via the first ventilation passage 82, as indicated by the dashed arrow in the drawing. In other words, the respiratory holes 80, i.e., the porous filter 81, are disposed in a deep portion covered with the cover member CV along the width direction of the housing 30.

As described above, by providing the first ventilation passage 82 surrounded by the arc-shaped wall 30d, the outer wall 30e, and the cover member CV upstream of the respiratory hole 80, the distance between the outside of the housing 30 and the porous filter 81 is increased, thereby making it difficult for rainwater, dust, and the like to reach the porous filter 81. Accordingly, sufficient respiratory function is maintained for a long period of time, and the life of the washer pump 20 can be extended.

In the washer pump 20 of this embodiment, a second ventilation passage 83 is provided further upstream of the first air passage 82. More specifically, as shown in FIG. 17, the second ventilation passage 83 is connected to the first ventilation passage 82 at the corner 32e on the opposite from the respiratory hole 80 with respect to the suction pipe 32c. The second ventilation passage 83 is formed so as to be folded back to the first ventilation passage 82, and one end thereof communicates with the other end of the first ventilation passage 82 via the notch portion 30f. Like the first ventilation passage 82, the second ventilation passage 83 is provided so as to extend over substantially the entire area in the width direction of the housing 30 that intersects the intake direction of the cleaning liquid "W".

However, the second ventilation passage 83 is not closed by the cover member CV, and as shown in FIGS. 3 and 17, the entire width direction of the housing 30 crossing the intake direction of the cleaning liquid "W" of the second ventilation passage 83 is opened. That is, part of the inside of the corner portion 32e is covered with the cover member CV. As a result, even if the washer pump 20 is accidentally exposed to water, it is difficult to form a water film or the like because the second ventilation passage 83 is elongated and opened to a large extent, and therefore, it is effectively suppressed that moisture or the like disturbs the respiratory operation.

Instead of the porous filter 81 fixed to the inside of the corner portion 32e by ultrasonic welding or the like, a filter member 90 as shown in FIG. 18 may be detachably provided in the respiratory hole 80. As a result, the filter member 90 can be periodically replaced, and the washer pump 20 is improved in maintainability. Specifically, the filter member 90 is composed of: a pipe member 91 made of rubber or the like, and a porous filter 92 fixed to one end in the axial direction of the pipe member 91 by ultrasonic welding or the like.

Next, the operation of the washer pump 20 formed as described above, in particular, the flow of the cleaning liquid "W" inside the housing 30 will be described in detail for each of the front-side flow path and the rear-side flow path.

Figure 19:
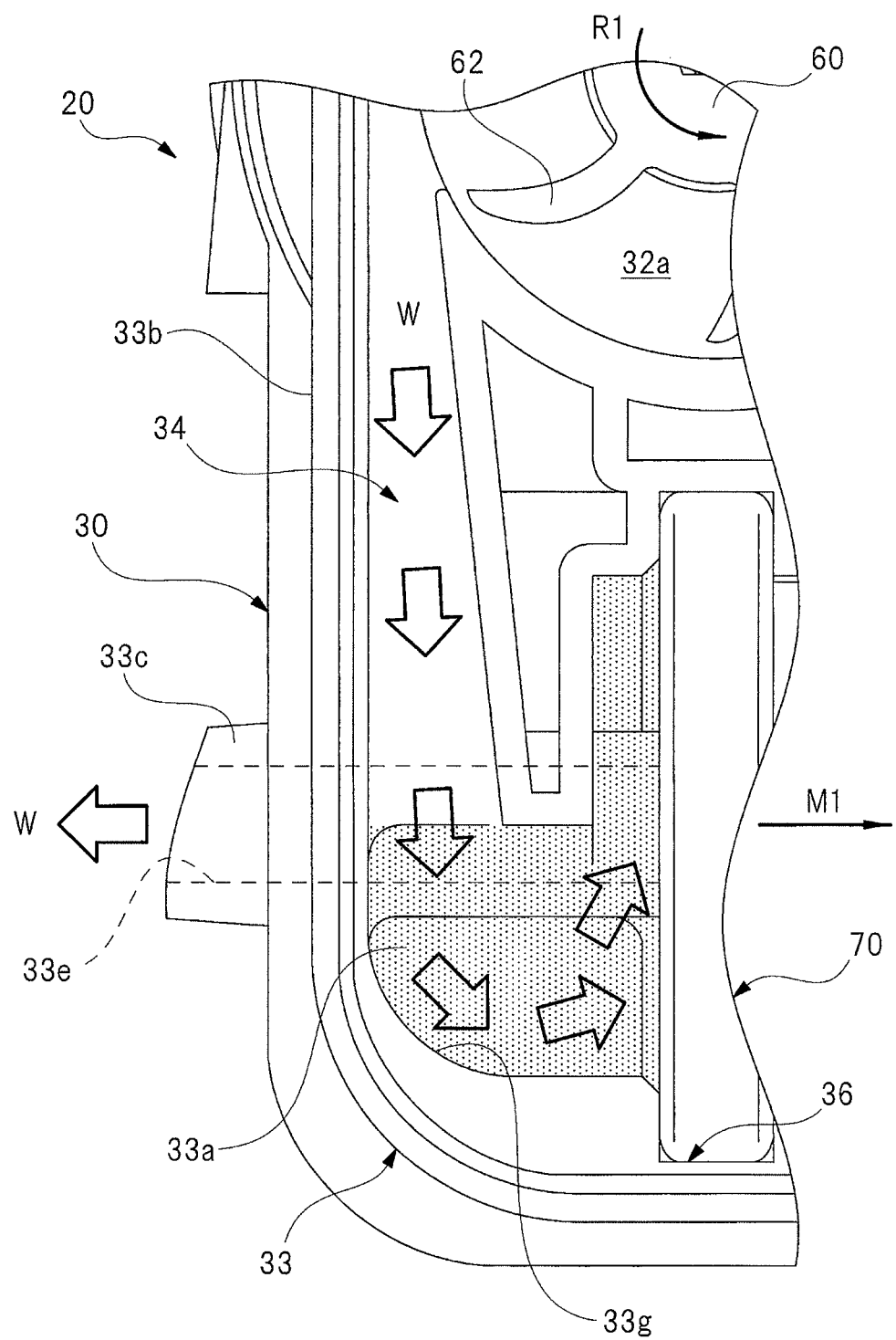
FIG. 19 is an explanatory view of the flow of cleaning liquid on the front-side.
Figure 20:
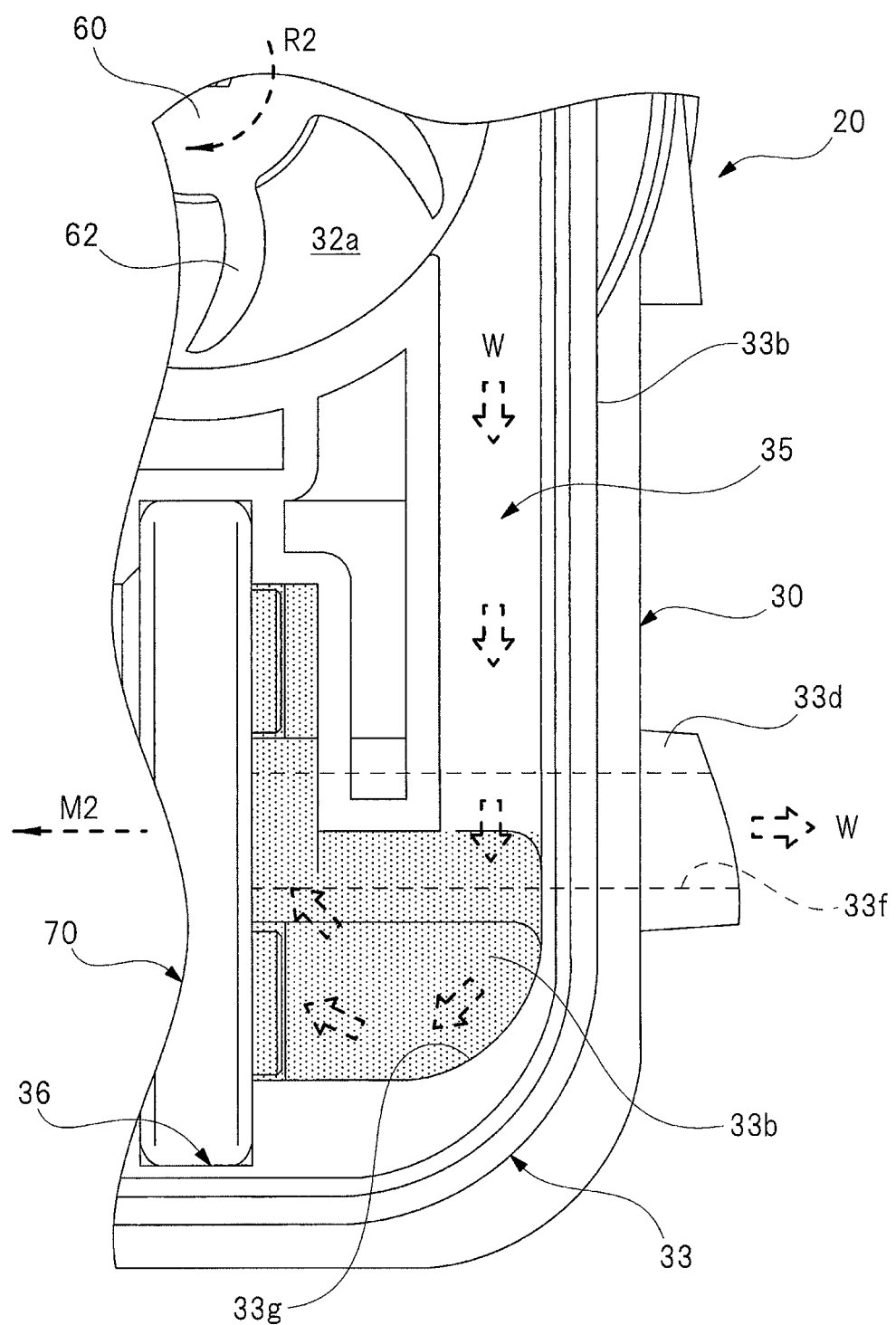
FIG. 20 is an explanatory view of the flow of cleaning liquid on the rear-side.

FIG. 19 is an explanatory view for explaining the flow of the cleaning liquid in the front-side flow path, and FIG. 20 is an explanatory view for explaining the flow of the cleaning liquid in the rear-side flow path.

[Regarding Front-Side]

When the armature shaft 44 of the motor 40 is driven so as to rotate in the counterclockwise direction by operating an operation switch (not shown), the impeller 60 is rotated in the direction of the solid arrow R1 as shown in FIG. 19. Then, the cleaning liquid "W" in the washer tank 10 is sucked into the pump chamber 32a through the cleaning liquid inflow hole 32b. Then, the cleaning liquid "W" in the pump chamber 32a flows into the front-side flow path 34.

Note that, at the time of rotating the impeller 60 in the counterclockwise direction, since the pumping capacity is higher than that at the time of rotating it in the clockwise direction, the flow rate of the cleaning liquid "W" flowing into the front-side flow path 34 is increased as shown by a solid line arrow in white in the drawing. The flow rate of the cleaning liquid "W" flowing through the front-side flow path 34 is higher than that of the cleaning liquid "W" flowing through the rear-side flow path 35.

Then, the cleaning liquid "W" having a high flow rate flowing through the front-side flow path 34 is discharged into the front-side valve chamber 33a (shaded portion in the figure). At this time, the flow speed of the cleaning liquid "W" is high, the cleaning liquid "W" is discharged into the front-side valve chamber 33a at the front-side discharge hole 33e, and immediately after being discharged into the front-side valve chamber 33a, the cleaning liquid "W" is rectified by following the curved wall portion 33g, so that the cleaning liquid "W" does not become turbulent in the front-side valve chamber 33a. Therefore, the cleaning liquid "W" discharged into the front-side valve chamber 33a is smoothly collected toward the center of the valve unit 70, that is, toward the valve main body 71b of the switching valve 71.

As a result, the inner pressure of the front-side valve chamber 33a is increased, the valve main body 71b is moved in the direction indicated by the solid arrow M1 in FIGS. 15 and 19, and the front-side discharge hole 33e is opened. Then, the cleaning liquid "W" is injected vigorously toward a predetermined injection point of the front-side windshield. At this time, the rear-side discharge hole 33f of the rear-side discharge pipe 33d is closed by the valve main body 71b.

[Regarding Rear-Side]

When the armature shaft 44 of the motor 40 is driven to rotate in the clockwise direction by operating the operation switch, as shown in FIG. 20, the impeller 60 is rotated in the direction of the dashed arrow R2. Then, the cleaning liquid "W" in the washer tank 10 is sucked into the pump chamber 32a through the cleaning liquid inflow hole 32b. Then, the cleaning liquid "W" in the pump chamber 32a flows into the rear-side flow path 35.

Note that, since the pumping capacity corresponding to the rotation of the impeller 60 in the clockwise direction is lower than the pumping capacity corresponding to the rotation of the impeller 60 in the counterclockwise direction, the quantity of the cleaning liquid "W" flowing into the rear-side flow path 35 is small as shown by the outlined dashed arrow in the drawing. The flow rate of the cleaning liquid "W" flowing through the rear-side flow path 35 is lower than that of the cleaning liquid "W" flowing through the front-side flow path 34.

Then, the cleaning liquid "W" flowing through the rear-side flow path 35 is discharged into the rear-side valve chamber 33b (shaded portion in the figure). At this time, the cleaning liquid "W" is discharged into the rear-side valve chamber 33b at the rear-side discharge hole 33f, and immediately after being discharged into the rear-side valve chamber 33b, the cleaning liquid "W" is rectified along the curved wall portion 33g, so that the cleaning liquid "W" does not become turbulent in the rear-side valve chamber 33b. Therefore, the cleaning liquid "W" discharged into the rear-side valve chamber 33b is smoothly collected toward the center of the valve unit 70, that is, toward the valve main body 71b of the switching valve 71.

As a result, the inner pressure of the rear-side valve chamber 33b is increased, the valve main body 71b is moved in the direction indicated by the dashed arrow M2 in FIGS. 15 and 20, and the rear-side discharge hole 33f is opened. Then, the cleaning liquid "W" is jetted toward a predetermined jetting point of the windshield on the rear-side. At this time, the front-side discharge hole 33e of the front-side discharge pipe 33c is closed by the valve main body 71b.

As described above in detail, according to the washer pump 20 of this embodiment, since the pump chamber 32a, the valve chambers 33a and 33b, the discharge holes 33e and 33f, and the flow paths 34 and 35 are integrally provided in the housing 30, respectively, in the case where these are formed of separate members, a step or the like that inhibits the flow of the cleaning liquid "W" does not need to be formed in the flow path of the cleaning liquid "W", so that the pressure loss of the cleaning liquid "W" can be reduced.

In addition, since the valve chambers 33a and 33b of the flow paths 34 and 35 extend to the discharge holes 33e and 33f, the cleaning liquid "W" flowing out of the flow paths 34 and 35 can be discharged at a portion closer to the central of the valve chambers 33a and 33b than before. As a result, the outlet portions of the flow paths 34 and 35 and the inlet portions of the discharge holes 33e and 33f can be brought closer to each other, and the turbulent of the cleaning liquid "W" in the valve chambers 33a and 33b can be suppressed, thereby reducing the pressure loss.

Therefore, the lowering of the injection capability is suppressed, and in the washer pump having the same injection capability as in the past, it is possible to adopt a small motor having a low output, and it is possible to realize further size and weight reduction of the washer pump.

Furthermore, according to the washer pump 20 of this embodiment, since the flow passage area of the front-side flow path 34 on the same side as the pump chamber 32a is smaller than the flow passage area of the front-side valve chamber 33a, the flow rate of the cleaning liquid "W" flowing through the front-side flow path 34 is increased, the flow of the cleaning liquid "W" into the front-side valve chamber 33a is smoothed, and rapid diffusion of the cleaning liquid "W" into the front-side valve chamber 33a can be suppressed. Therefore, turbulent of the cleaning liquid "W" in the valve chambers 33a and 33b can be suppressed more reliably.

Furthermore, according to the washer pump 20 of this embodiment, since the front-side flow path 34 includes the inner wall portion 34b that gradually increases the flow passage area from the pump chamber 32a toward the front-side valve chamber 33a, the flow passage area of the front-side flow path 34 can be changed linearly from the pump chamber 32a toward the front-side valve chamber 33a. Therefore, the turbulent flow in the front-side flow path 34 is suppressed more reliably, and the washer pump 20 with further pressure loss and high efficiency is realized.

In addition, according to the washer pump 20 of this embodiment, since the front-side flow path 34 has an outer wall portion 34a facing the inner wall portion 34b, the outer wall portion 34a is provided near the side wall 30b of the housing 30 in parallel with the side wall 30b, and the inner wall portion 34b is provided on the inside of the housing 30, the front-side flow path 34 in which the flow passage area gradually increases from the pump chamber 32a toward the front-side valve chamber 33a can be formed on the inside of the housing 30 without increasing the size of the housing 30. Therefore, the dedicated design of the cover member CV is unnecessary, and the increase in cost is suppressed.

Furthermore, according to the washer pump 20 of this embodiment, since the flow passage area of the front-side flow path 34 in the pump chamber 32a is smaller than the flow passage area of the pump chamber 32a of the rear-side flow path 35, it is possible to make the pump capacity different according to the rotation of the motor 40 in the positive direction or the reverse direction.

Furthermore, since the front-side flow path 34 is provided in order to deal with the cleaning liquid "W" to be outputted toward the front-side windshield of the vehicle, it is possible to substantially maintain the target position of the cleaning liquid "W" on the front-side windshield without being affected by winds. That is, the cleaning performance of the washer pump 20 is improved.

Furthermore, according to the washer pump 20 of this embodiment, the housing 30 is provided with: a motor accommodating portion 31 for accommodating the motor 40; and a corner portion 32e disposed between the motor accommodating portion 31 and the washer tank 10, and the respiratory hole 80 for communicating the inside of the motor accommodating portion 31 with its outside is provided between the motor accommodating portion 31 and the corner portion 32e. As a result, with the washer pump 20 attached to the washer tank 10, it is possible to arrange the respiratory hole 80 within the range of its outline including the washer pump 20 and the washer tank 10. Therefore, it is possible to prevent the respiratory structure from being damaged at the time of installation or the like, and it becomes unnecessary to use a member for the breathing structure, which is used in the past, and it becomes possible to achieve a further reduction in size and weight.

Furthermore, according to the washer pump 20 of this embodiment, one end side of the respiratory hole 80 is opened inside the motor accommodating portion 31, the other end side of the breathing hole 80 is opened inside the corner portion 32e, and the inside of the corner portion 32e is communicated with the outside, and the corner portion 32e is partially covered with a cover member CV that closes the second opening 30a formed on the same side as breathing hole 80 of the housing 30. This makes it difficult for rainwater, dust, and the like to reach the porous filter 81, so that a sufficient respiratory function can be maintained for a long period of time, and the life of the washer pump 20 can be extended.

Furthermore, according to the washer pump 20 of this embodiment, since the porous filter 81 is provided in the respiratory hole 80 to regulate the passage of water while allowing the passage of air, it is possible to reliably prevent the entry of rainwater or the like into the motor chamber 31a.

Furthermore, according to the washer pump 20 of this embodiment, since the porous filter 81 is provided on the inside of the corner portion 32e, and covered with the cover member CV which closes the second opening 30a formed on same side as the respiratory hole 80 of the housing 30, rainwater or the like can be hardly reached to the porous filter 81. Therefore, the porous filter 81 can be kept clean for a long period of time, and the maintenance cycle can be extended.

Furthermore, according to the washer pump 20 of this embodiment, since one end side of the respiratory hole 80 is opened inside the motor accommodating portion 31, the other end side of the breathing hole 80 is opened inside the corner portion 32e, the first ventilation passage 82 communicating with the other end side of the breathing hole 80 is provided, and the first ventilation passage 82 is covered with the cover member CV which closes the housing 30, rainwater or the like can be made harder to reach the porous filter 81.

Furthermore, according to the washer pump 20 of this embodiment, since the first ventilation path 82 extends in the width direction of the housing 30 intersecting with the intake direction of the cleaning liquid "W", the distance of the first ventilation path 82 can be increased, and rainwater or the like can be made harder to reach the porous filter 81.

Furthermore, according to the washer pump 20 of this embodiment, one end side of the first ventilation passage 82 communicates with the respiratory hole 80, the other end side of the first ventilation passage 82 communicates with the second ventilation passage 83 provided in the housing 30, the second ventilation passage 83 extends in the width direction of the housing 30, and is not covered by the cover member CV, so that the second ventilation passage 83 can be opened slender and large, making it difficult to form a water membrane or the like, and rainwater or the like can be made more difficult to reach the porous filter 81.

In addition, according to the washer pump 20 of this embodiment, an erroneous assembly operation prevention mechanism is provided between the housing 30 and the frame body 72, and composed of: a recess portion 36e and an erroneous assembly operation preventing projection 72c for notifying erroneous assembly of the valve unit 70 with respect to the housing 30 by causing the switching valve 71 to protrude from the housing 30.

As a result, when the valve unit 70 is incorrectly assembled to the housing 30, the valve unit 70 protrudes from the housing 30, and the cover member CV that closes the housing 30 cannot be attached to the housing 30. In other words, the washer pump 20 is not physically assembled, so that erroneous assembly of the valve unit 70 with respect to the housing 30 is reliably prevented. Therefore, the process yield of the washer pump 20 is improved, and the reliability of the product is improved.

Furthermore, according to the washer pump 20 of this embodiment, the erroneous assembly operation prevention mechanism is formed by a recessed portion 36e provided in the housing 30 and recessed on one side in the moving direction of the valve main body 71b (the switching valve 71), and an erroneous assembly operation preventing projection 72c provided in the frame body 72 and projecting on one side in the moving direction of the valve main body 71b and engaged with the recessed portion 36e. Therefore, the assembler or the like can easily visually confirm the recessed portion 36e and the erroneous assembly operation preventing projection 72c, and can more reliably prevent the valve unit 70 from being erroneously assembled to the housing 30.

According to the washer pump 20 of this embodiment, the frame body 72 is formed into a rectangular shape (as viewed from the moving direction of the valve main body 71b), the erroneous assembly operation preventing projections 72c are respectively provided at the four corners of the frame body 72, and the outside of the erroneous assembly operation preventing projections 72c along the radial direction of the frame body 72 is engaged with the inside of the recessed portion 36e along the radial direction of the frame body 72. Therefore, the center position of the valve main body 71b and the center positions of the front-side discharge pipe 33c and the rear-side discharge pipe 33d can be accurately positioned without shifting. Therefore, it is possible to suppress variation in the movement characteristic of the valve main body 71b (valve opening characteristic/valve closing characteristic) for each product. In addition, since the erroneous assembly operation preventing projections 72c are provided at the four corners of the frame body 72, when the valve unit 70 is assembled to the housing 30, any one of the four sides formed by the outer periphery of the mounting portion 71a of the switching valve 71 can be inserted toward the housing 30, and the insertion direction of the valve unit 70 is not limited.

Furthermore, according to the washer pump 20 of this embodiment, the erroneous assembly operation preventing projection 72c is formed with an inclined surface 72d for guiding the flow of the cleaning liquid "W" toward the center of the switching valve 71 (i.e., the valve main body 71b) on the same side as the recessed portion 36e along the moving direction of the valve main body 71b. As a result, the flow of the cleaning liquid "W" can be smoothed, and the efficiency of the washer pump 20 is improved.

Furthermore, according to the washer pump 20 of this embodiment, since the frame body 72 is higher in rigidity than the switching valve 71, it is possible to prevent the valve unit 70 from being forcibly erroneously assembled to the housing 30 in advance, and it is possible to reliably prevent the valve unit 70 from being erroneously assembled to the housing 30.

Furthermore, according to the washer pump 20 of this embodiment, since the motor chamber 31a, the pump chamber 32a, the valve chambers 33a and 33b, and the discharge holes 33e and 33f are integrally provided in the housing 30, it is unnecessary to prepare the valve unit as a discrete component to the housing as in the past. Therefore, it is possible to cope with the size and weight reduction and multifunction without incurring any increase in size and cost. In addition, it is possible to eliminate a decrease in the flow rate of the liquid caused by a decrease in the connection accuracy, and it is possible to reliably suppress a decrease in the injection capability of the liquid, and the like.

In addition, according to the washer pump 20 of this embodiment, the motor 40 includes: a yoke 41 fixed to the inside of the motor chamber 31a; two magnets 42 fixed to the inside of the yoke 41, a commutator 45 fixed to the armature shaft 44 and having six segments 45a, and an armature core 43 fixed to the armature shaft 44 and having six slots 43a around which coils 46 are wound by overlapping winding, and rotated on the inside of the magnet 42.

Therefore, even if the armature core 43 is reduced in diameter, the coil 46 can be easily attached to the armature core 43 by the double flyer method in three winding works. Furthermore, compared with a motor using one magnet in a ring shape, by using two magnets obtained by dividing the magnet, it is possible to improve the layout property at the time of fixing the magnet in addition to downsizing of the magnet. Therefore, it is possible to cope with the downsizing and weight reduction of the motor 40 while suppressing the manufacturing cost.

Furthermore, according to the washer pump 20 of this embodiment, the motor 40 includes a power feeding brush 54 slidably contacted to the commutator 45, and a retaining plate 53 that holds the power feeding brush 54 by the brush retaining portion 53b, and two bent portions 53c are provided near the base end portion 53a of the retaining plate 53.

As a result, the mobile range of the retaining plate 53 can be widened, and the power feeding brush 54 can be brought into sliding contact with the commutator 45 with an optimal pressing force. In addition, since the power supply brush 54 can be used up to the last, the size of the power supply brush 54 can be reduced, and the power supply brush 54 can be easily arranged in a space-saving manner.

Furthermore, according to the washer pump 20 of this embodiment, the motor chamber 31a is closed by the motor cover 50, the connector connection portion 52 to which the power supply connector is connected is provided on the outside of the motor cover 50, the rib 55 is provided on the inside of the motor cover 50, and the base end portion 53a of the retaining plate 53 is mounted.

Accordingly, even if the cover main body 51 is reduced in thickness, the cover main body 51 has sufficient intensity, and sufficiently withstand the integrating of the connector connecting portion 52 and the rigid fixation of the base end portion 53a of the retaining plate 53.

Furthermore, according to the washer pump 20 of this embodiment, the impeller 60 is provided with a bowl-shaped convex portion 62a, and the pump chamber 32a is provided with a bowl-shaped recess 32d extending along the bowl-shaped convex portion 62a of the impeller 60.

As a result, the clearance between the pump chamber 32a and the impeller 60 can be reduced to improve the pump efficiency, thereby preventing the pump capacity from deteriorating. Therefore, the washer pump 20 can be made smaller and lighter.

Furthermore, according to the washer pump 20 according to this embodiment, a pair of reinforcing ribs 31c is formed on the outer circumference portion of the motor accommodating portion 31 (housing 30) that are fitted to each tank side retaining portion 14 provided in the washer tank 10.

This makes it possible to mount the washer pump 20 in a washer tank in which an old-type washer pump is mounted while reinforcing the motor accommodating portion 31 in response to downsizing of the motor accommodating portion 31. That is, for example, during maintenance of the washer apparatus, the washer pump 20 can be simply employed in place of the old-type washer pump.

Furthermore, according to the washer pump 20 of this embodiment, a pair of discharge holes 33e and 33f is provided closer to the motor chamber 31a than the second opening 30a of each of the valve chambers 33a and 33b.

As a result, since the pair of discharge holes 33e and 33f is provided between the lower end and the upper end of the suction pipe 32c, the height of the washer pump 20 in the axial direction of the motor 40 can be reduced. Therefore, it is possible to realize a reduction in size and weight of the washer pump 20 while suppressing the complexity of the shape of the washer pump 20.

It is needless to say that the present invention is not limited to the above-mentioned embodiments, and various modifications can be made without departing from the scope of the present invention. For example, in the above embodiment, the shape of the front-side flow path 34 and the shape of the rear-side flow path 35 are different from each other, but the present invention is not limited to this, and the front-side flow path and the rear-side flow path may have the same shape according to the specification of the washer pump 20 or the like.

In the above embodiment, the inner wall portion 34b of the front-side passage area wall, and the flow passage area of the front-side flow path 34 is changed linearly, but the present invention is not limited to this, and the flow passage area of the front-side flow path 34 may be changed stepwise by forming the inner wall portion 34b in a stepwise manner in accordance with the specification of the washer pump 20 or the like.

Furthermore, in the above embodiment, although the washer pump 20 is shown as the one in which the cleaning liquid "W" is jetted to the front-side windshield and the windshield on the rear-side of the vehicle, the present invention is not limited to this, and can be applied to, for example, a washer pump in which the cleaning liquid "W" is jetted to the forward side and the return side of the wiper blade in the wiping direction.

In addition, material, shape, dimension, number, installation place, and the like of each component in the above embodiment are arbitrary as long as the present invention can be achieved, and are not limited to the above embodiment.

The washer pump is used for sucking the cleaning liquid stored in the washer tank, jetting the cleaning liquid to the windshield, and removing dirt such as dust attached to the windshield.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A washer pump configured to suck liquid stored in a tank and configured to jet the liquid to a front-side windshield and a rear-side windshield of a vehicle, the washer pump comprising:
    a motor that rotates a rotation shaft in a forward and a reverse direction;
    a housing that accommodates the motor;
    an impeller that is rotated by the motor in a first and a second direction;
    a pump chamber in which the impeller is housed;
    a front-side valve chamber in which the liquid discharged to the front-side windshield flows in response to rotation of the impeller in the first direction;
    a rear-side valve chamber in which the liquid discharged to the rear-side windshield flows in response to rotation of the impeller in the second direction;
    a switching valve for partitioning the front-side and rear-side valve chambers,
    a front-side discharge hole that is provided on one side of the switching valve in a moving direction of the switching valve and in which the liquid discharged to the front-side windshield flows;
    a rear-side discharge hole that is provided on an other side of the switching valve in the moving direction and in which the liquid discharged to the rear-side windshield flows;
    a front-side flow path provided between the pump chamber and the front-side valve chamber; and
    a rear-side flow path provided between the pump chamber and the rear-side valve chamber,
    wherein the pump chamber, the front-side and rear-side valve chambers, the front-side and rear-side discharge holes, and the front-side and rear-side flow paths are integrally provided respectively in the housing,
    the front-side flow path extends to the front-side discharge hole of the front-side valve chamber so that the liquid which flows out of the front-side flow path is discharged at a center portion of the front-side valve chamber,
    the rear-side flow path extends to the rear-side discharge hole of the rear-side valve chamber so that the liquid which flows out of the rear-side flow path is discharged at a center portion of the rear-side valve chamber,
    the front-side flow path includes:
        an inclined wall provided on an inside of a side wall of the housing and increasing a flow passage area from the pump chamber to the front-side valve chamber; and
        an opposed wall disposed so as to be opposed to the inclined wall and is provided parallel to the side wall of the housing,
    the rear-side flow path includes a pair of wall portions that are provided on the inside of the side wall of the housing, are parallel to each other, and are provided parallel to the side wall,
    the pair of wall portions has a lateral wall portion disposed outside the rear-side flow path and an inner wall portion disposed inside the rear-side flow path, the lateral and inner wall portions being parallel to each other,
    an end portion of each valve-chamber-side of the inclined wall and the opposed wall is connected to the front-side discharge hole, and an end portion of each valve-chamber-side of the wall portions is connected to the rear-side discharge hole,
    a pump chamber side of the front-side flow path is smaller than a pump chamber side of the rear-side flow path, and a front-side valve chamber side of the front-side flow path is larger than a rear-side valve chamber side of the rear-side flow path,
    a front-side curved wall portion is formed at a position facing a discharge direction of the liquid discharged from the front-side flow path in the front-side valve chamber so that diffusion of the liquid into the front-side valve chamber is suppressed and turbulent flow of the liquid in the front-side valve chamber is suppressed,
    a rear-side curved wall portion is formed at a position facing a discharge direction of the liquid discharged from the rear-side flow path in the rear-side valve chamber so that diffusion of the liquid into the rear-side valve chamber is suppressed and turbulent flow of the liquid in the rear-side valve chamber is suppressed, and
    a length of the inclined wall from the front-side valve chamber to the pump chamber is longer than a length of the inner wall portion from the rear-side valve chamber to the pump chamber.

2. The washer pump according to claim 1, wherein
    the flow passage area of the front-side flow path adjacent the pump chamber is smaller than a flow passage area of the rear-side flow path adjacent the pump chamber, and
    the flow passage area of the front-side flow path adjacent the front-side valve chamber is larger than a flow passage area of the rear-side flow path adjacent the rear-side valve chamber.

* * * * *